United States Patent
Hanzawa

(10) Patent No.: US 12,395,729 B2
(45) Date of Patent: Aug. 19, 2025

(54) IMAGING APPARATUS AND IMAGING CONTROL METHOD

(71) Applicant: SONY SEMICONDUCTOR SOLUTIONS CORPORATION, Kanagawa (JP)

(72) Inventor: Katsuhiko Hanzawa, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 219 days.

(21) Appl. No.: 17/905,879

(22) PCT Filed: Mar. 4, 2021

(86) PCT No.: PCT/JP2021/008554
§ 371 (c)(1),
(2) Date: Sep. 8, 2022

(87) PCT Pub. No.: WO2021/187148
PCT Pub. Date: Sep. 23, 2021

(65) Prior Publication Data
US 2023/0156323 A1 May 18, 2023

(30) Foreign Application Priority Data
Mar. 19, 2020 (JP) .................. 2020-048950

(51) Int. Cl.
*H04N 17/00* (2006.01)
*G06K 1/00* (2006.01)
(Continued)

(52) U.S. Cl.
CPC ....... *H04N 23/651* (2023.01); *G06V 10/7715* (2022.01); *H04N 23/667* (2023.01); *H04N 25/42* (2023.01)

(58) Field of Classification Search
CPC ...... H04N 25/44; H04N 25/46; H04N 23/667; H04N 25/42; H04N 23/651; G06V 10/7715; G06V 20/52
See application file for complete search history.

(56) References Cited

U.S. PATENT DOCUMENTS

| 7,702,135 B2 * | 4/2010 | Hill ...................... G08B 25/009 382/256 |
| 8,395,671 B2 * | 3/2013 | Kimura ................... G06T 7/246 348/208.14 |

(Continued)

FOREIGN PATENT DOCUMENTS

| JP | 2010-041435 A | 2/2010 |
| JP | 2010-171666 A | 8/2010 |

(Continued)

OTHER PUBLICATIONS

International Search Report and Written Opinion of PCT Application No. PCT/JP2021/008554, issued on Jun. 1, 2021, 08 pages of ISRWO.

*Primary Examiner* — Philip P. Dang
(74) *Attorney, Agent, or Firm* — CHIP LAW GROUP

(57) ABSTRACT

Provided is an imaging apparatus including a mode control unit. The mode control unit shifts, when a motion is detected on a motion detection mode to detect the motion on the basis of image information, the mode to a feature detection mode to detect features on the basis of image information having a higher resolution than a resolution of the image information that is used for the motion detection. The mode control unit shifts, when a specific feature is detected on the feature detection mode, the mode to an imaging mode to acquire image information having a higher resolution than the resolution of the image information that is used for the feature detection.

18 Claims, 13 Drawing Sheets

(51) Int. Cl.
  *G06V 10/77* (2022.01)
  *H04N 23/65* (2023.01)
  *H04N 23/667* (2023.01)
  *H04N 25/42* (2023.01)

(56) References Cited

U.S. PATENT DOCUMENTS

| | | | | |
|---|---|---|---|---|
| 9,007,490 | B1* | 4/2015 | Yuan | G06F 3/005 |
| | | | | 348/241 |
| 10,009,549 | B2* | 6/2018 | Omid-Zohoor | H04N 23/651 |
| 10,194,097 | B2* | 1/2019 | Abbas | H04N 23/698 |
| 10,334,158 | B2* | 6/2019 | Gove | H04N 23/651 |
| 10,531,002 | B2* | 1/2020 | Takahashi | H04N 23/951 |
| 10,574,890 | B2* | 2/2020 | Moloney | H04N 23/65 |
| 10,586,433 | B2* | 3/2020 | Stewart | G08B 13/19606 |
| 11,445,133 | B2* | 9/2022 | Petkov | H04N 25/50 |
| 11,514,581 | B2* | 11/2022 | Hoshino | H04N 25/40 |
| 11,726,184 | B2* | 8/2023 | Ferreira | G01S 17/894 |
| | | | | 356/4.01 |
| 2014/0118592 | A1* | 5/2014 | Yoon | H04N 25/47 |
| | | | | 348/308 |
| 2020/0162735 | A1* | 5/2020 | Ueno | H04N 19/124 |

FOREIGN PATENT DOCUMENTS

| | | |
|---|---|---|
| JP | 2018-022935 A | 2/2018 |
| WO | 2019/146178 A1 | 8/2019 |

\* cited by examiner

IMAGING APPARATUS AND IMAGING CONTROL METHOD

CROSS REFERENCE TO RELATED APPLICATIONS

This application is a U.S. National Phase of International Patent Application No. PCT/JP2021/008554 filed on Mar. 4, 2021, which claims priority benefit of Japanese Patent Application No. JP 2020-048950 filed in the Japan Patent Office on Mar. 19, 2020. Each of the above-referenced applications is hereby incorporated herein by reference in its entirety.

TECHNICAL FIELD

The present technology relates to, for example, an imaging apparatus that is used for a surveillance camera and the like.

BACKGROUND ART

Conventionally, surveillance cameras have been widely used in fields such as anti-crime and traffic fields. There is a problem in that power consumption increases if surveillance cameras constantly capture images at high-resolution because they needs to be basically constantly driven.

Patent Literature 1 below has been disclosed as a technology related to such a problem. In the technology described in Patent Literature 1 below, the shift between a pixel-binning mode and a normal mode is controlled.

On the pixel-binning mode, low-resolution images based on the pixel-binning are acquired and a motion (event) of an object to be imaged is detected on the basis of this image. When the motion of the object to be imaged is detected on the pixel-binning mode, the mode is shifted to the normal mode. On the normal mode, images are captured at a high-resolution without the pixel-binning. After a predetermined number of images are captured on the normal mode, the mode is shifted to the pixel-binning mode.

CITATION LIST

Patent Literature

Patent Literature 1: Japanese Patent Application Laid-open No. 2018-22935

DISCLOSURE OF INVENTION

Technical Problem

However, in a case of the technology of Patent Literature 1, a shift to the normal mode is performed also when erroneous detection occurs in motion detection, which unnecessarily increases the number of shifts to the normal mode. Therefore, there is a limitation on power consumption reduction.

In view of the above-mentioned circumstances, it is an object of the present technology to provide a technology such as an imaging apparatus capable of suitably reducing power consumption.

Solution to Problem

An imaging apparatus according to the present technology includes a mode control unit.

The mode control unit
shifts, when a motion is detected on a motion detection mode to detect the motion on the basis of image information, the mode to a feature detection mode to detect features on the basis of image information having a higher resolution than a resolution of the image information that is used for the motion detection, and
shifts, when a specific feature is detected on the feature detection mode, the mode to an imaging mode to acquire image information having a higher resolution than the resolution of the image information that is used for the feature detection.

In the present technology, the feature detection mode is provided between the motion detection mode and the imaging mode, and therefore it is possible to prevent unnecessary shifting to the imaging mode, and it is possible to suitably reduce the power consumption of the imaging apparatus.

In the imaging apparatus, the mode control unit may shift the mode to the motion detection mode when the specific feature is not detected on the feature detection mode.

In the imaging apparatus, the mode control unit may shift the mode to the motion detection mode when a prescribed number of pieces of image information are acquired on the imaging mode.

In the imaging apparatus, the feature detection mode may include a first feature detection mode and a second feature detection mode to more specifically perform feature detection than on the first feature detection mode.

In the imaging apparatus, the resolution of the image information that is used for the feature detection on the second feature detection mode may be higher than the resolution of the image information that is used for the feature detection on the first feature detection mode.

In the imaging apparatus, the image information that is used for the feature detection on the first feature detection mode may be an entire image and the image information that is used for the feature detection on the second feature detection mode may be a partial image corresponding to a portion subjected to the features detection on the first feature detection mode.

The partial image may have a resolution higher than a resolution of the entire image.

In the imaging apparatus, the mode control unit may shift the mode to the first feature detection mode when the motion is detected on the motion detection mode, shift the mode to the second feature detection mode when a specific feature is detected on the first feature detection mode, and shift the mode to the imaging mode when a specific feature is detected on the second feature detection mode.

In the imaging apparatus, the mode control unit may shift the mode to when a specific feature is not detected on the first feature detection mode and shift the mode to the motion detection mode when a specific feature is not detected on the second feature detection mode.

The imaging apparatus may further include a motion extraction unit that extracts the motion from the image information on the motion detection mode.

In the imaging apparatus, the motion extraction unit may extract the motion from image information of an analog signal.

In the imaging apparatus, the motion extraction unit may extract the motion from image information of a digital signal.

The imaging apparatus may further include a feature extraction unit that extracts the features from the image information on the feature detection mode.

In the imaging apparatus, the feature extraction unit may extract features from image information of an analog signal.

In the imaging apparatus, the feature extraction unit may extract features from image information of a digital signal.

The imaging apparatus may further include an image sensor including a pixel array portion that obtains the image information, in which inside the image sensor, provided may be the mode control unit, a motion extraction unit that extracts the motion from the image information on the motion detection mode, a motion determination unit that determines whether the motion is detected on the basis of the motion extracted by the motion extraction unit on the motion detection mode, and a feature extraction unit that extracts features from the image information on the feature detection mode.

In the imaging apparatus, inside the image sensor, provided may be a feature determination unit that determines whether the specific feature is detected on the basis of features extracted by the feature extraction unit on the feature detection mode.

In the imaging apparatus, outside the image sensor, provided may be a feature determination unit that determines whether the specific feature is detected on the basis of features extracted by the feature extraction unit on the feature detection mode.

An imaging control method according to the present technology includes:

shifting, when the motion is detected on the motion detection mode to detect the motion on the basis of the image information, the mode to the feature detection mode to detect features on the basis of the image information having a higher resolution than a resolution of the image information that is used for the motion detection; and shifting, when a specific feature is detected on the feature detection mode, the mode to the imaging mode to acquire image information having a higher resolution than the resolution of the image information that is used for the feature detection.

A program according to the present technology causes a computer to execute processing, including:

shifting, when a motion is detected on a motion detection mode to detect the motion on the basis of image information, the mode to a feature detection mode to detect features on the basis of image information having a higher resolution than a resolution of the image information that is used for the motion detection; and shifting, when a specific feature is detected on the feature detection mode, the mode to an imaging mode to acquire image information having a higher resolution than the resolution of the image information that is used for the feature detection.

MODE(S) FOR CARRYING OUT THE INVENTION

Hereinafter, embodiments according to the present technology will be described with reference to the drawings.

First Embodiment

<Overall Configuration of Imaging Apparatus 100 and Configurations of Respective Parts>

Figure 1:
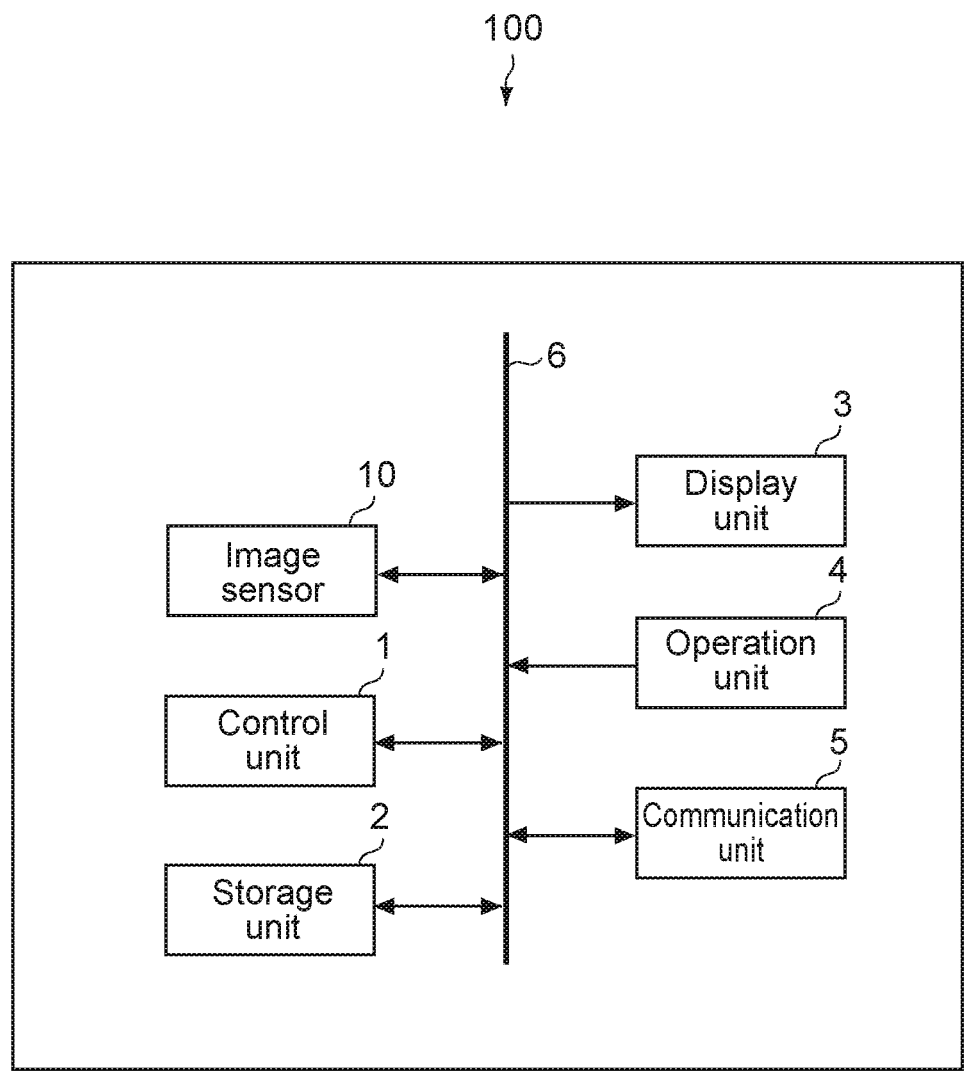
FIG. 1 A block diagram showing a configuration of an imaging apparatus according to a first embodiment.

FIG. 1 is a block diagram showing a configuration of an imaging apparatus 100. The imaging apparatus 100 is, for example, a surveillance camera and installed and used in a constant location.

As shown in FIG. 1, the imaging apparatus 100 includes an image sensor 10, a control unit 1, a storage unit 2, a display unit 3, an operation unit 4, and a communication unit 5. These respective parts are electrically connected to one another via a bus 6.

The image sensor 10 includes, for example, a solid-state imaging element (pixel array portion 11) such as a charge coupled device (CCD) sensor and a complemented metal oxide semiconductor (CMOS) sensor. Further, the image sensor 10 includes an optical system including a plurality of lenses, a diaphragm, a shutter, and the like. The image sensor 10 outputs acquired image information to the storage unit 2 and the display unit 3 as necessary. It should be noted that a detailed configuration of the image sensor 10 will be described later with reference to FIG. 2.

The control unit 1 is constituted by, for example, a central processing unit (CPU) and the like. The control unit 1 executes various arithmetic operations on the basis of various programs stored in the storage unit 2 and comprehensively controls the respective parts of the imaging apparatus 100.

The storage unit 2 includes a nonvolatile memory in which various programs required for processing of the control unit 1 and image information acquired by the image sensor 10 are stored and a volatile memory that is used as a working area for the control unit 1. It should be noted that the various programs may be read from a portable recording medium such as an optical disc and a semiconductor memory or may be downloaded from a server apparatus over a network.

The display unit 3 is constituted by, for example, a liquid-crystal display, an electro-luminescence (EL) display, and the like. On the basis of the control of the control unit 1, the display unit 3 displays image information acquired by the image sensor 10 on a screen as necessary.

The operation unit 4 is various operation units of a press button-type, a proximity-type, and the like, and detects and outputs the user's operation to the control unit 1.

The communication unit 5 performs communication with external apparatuses in a wired or wireless manner. It should be noted that the external apparatuses that communicates with the imaging apparatus 100 includes, for example, a mobile phone (including a smartphone), a personal computer (PC), a server apparatus over a network, and the like.

It should be noted that although the image sensor 10, the control unit 1, the storage unit 2, the display unit 3, and the operation unit 4 are provided in the same apparatus in the example shown in FIG. 1, these respective parts may be separately provided in a plurality of apparatuses. In this case, for example, the image sensor 10 is provided in the imaging apparatus 100 and the other respective parts (the control unit 1, the storage unit 2, the operation unit 4, etc.) are provided in a separate apparatus.

That is, it is sufficient that the imaging apparatus 100 at least includes the image sensor 10. The apparatus separate from the imaging apparatus 100 may be a dedicated apparatus or may be a generally-used apparatus. In a case where the separate apparatus is a generally-used apparatus, the separate apparatus may be a mobile phone (including a smartphone), a PC, a server apparatus over a network, or the like.

<Image Sensor 10>

Figure 2:
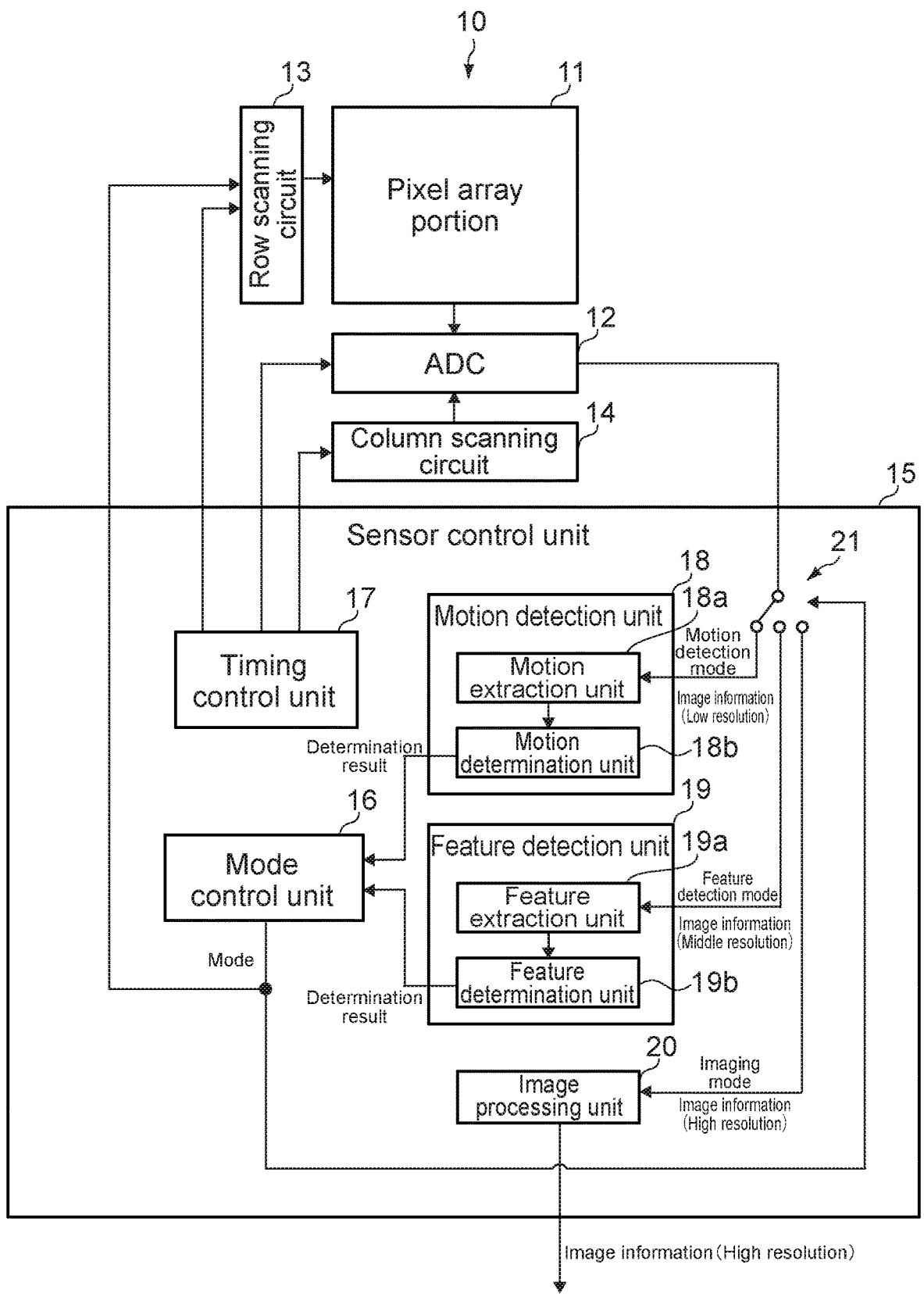
FIG. 2 A block diagram showing a configuration of an image sensor according to the first embodiment.

FIG. 2 is a block diagram showing a configuration of the image sensor 10. As shown in FIG. 2, the image sensor 10 includes the pixel array portion 11, an analog to digital converter (ADC) 12, a row scanning circuit 13, a column scanning circuit 14, and a sensor control unit 15. The sensor control unit 15 includes a mode control unit 16, a timing control unit 17, a motion detection unit 18, a feature detection unit 19, an image processing unit 20, and a switch 21.

Here, in the present embodiment, three modes, i.e., the motion detection mode, the feature detection mode, the imaging mode, are prepared. The three modes are shifted under the control of the mode control unit 16.

The motion detection mode is a mode on which image information having a resolution relatively lower than that of the image information that is used on the feature detection mode and the imaging mode is acquired and is also a mode on which a motion of the object to be imaged is detected on the basis of the image information having this lower resolution. It should be noted that in the description below, the image information acquired on the motion detection mode will be referred to as low-resolution image information for the sake of convenience.

The feature detection mode is a mode on which image information having a resolution relatively higher than that of the image information that is used on the motion detection mode and having a resolution relatively lower that of the image information that is used on the imaging mode is acquired and is also a mode on which a feature of the object to be imaged is detected on the basis of the image information having this resolution. It should be noted that in the description below, the image information acquired on the feature detection mode will be referred to as middle-resolution image information for the sake of convenience.

The imaging mode is a mode on which image information having a resolution relatively higher than that of the image information that is used on the motion detection mode and the feature detection mode is acquired and imaging is performed. It should be noted that in the description below, the image information acquired on the imaging mode will be referred to as high-resolution image information for the sake of convenience.

The pixel array portion 11 includes a plurality of pixels arranged in a two-dimensional grid form. Each pixel photoelectrically converts light entering through an optical system such as lens and generates electric-charge information depending on the light intensity. The pixel array portion 11 generates analog-signal image information by photoelectric conversion using the plurality of pixels and outputs the generated analog-signal image information to the ADC 12.

Figure 5:
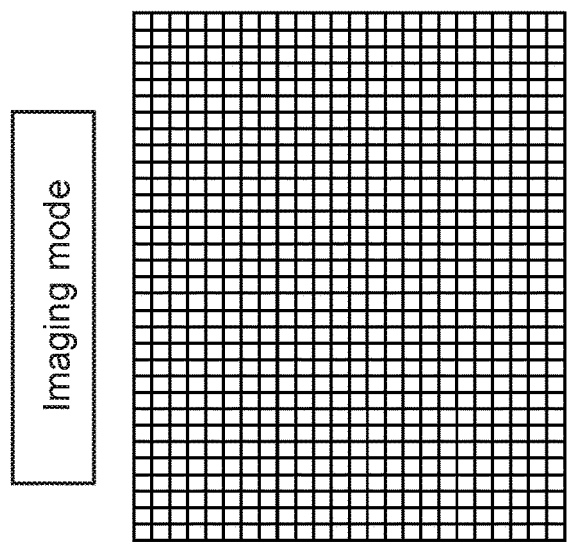
FIG. 5 A diagram showing a resolution of image information acquired on each mode in a pixel array portion.
Figure 5:
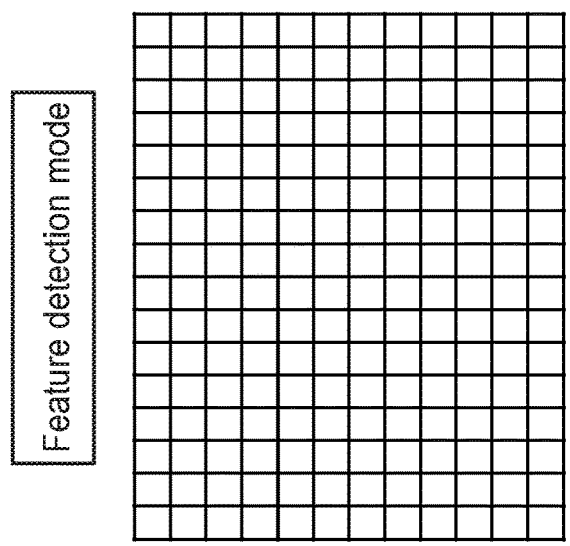
Figure 5:
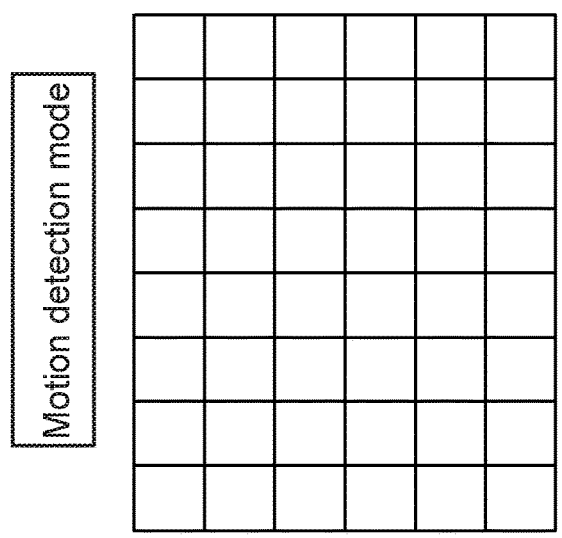

FIG. 5 is a diagram showing the resolution of the image information acquired on each mode in the pixel array portion 11.

On the motion detection mode, for example, a plurality of pixels (e.g., 16×16=256 pixels, 32×32=1024 pixels, etc.) in the pixel array portion 11 is set as one block.

Then, on the motion detection mode, image information is acquired by reding electric-charge information for each block (binning technology). It should be noted that on the motion detection mode, image information may be acquired by reading electric-charge information of an arbitrary pixel of each block from each block (random sampling technology).

The resolution of the image information on the motion detection mode is, for example, 40×30 px, 32×20 px, 16×5 px, or the like.

Also on the feature detection mode, a plurality of pixels (e.g., 2×2=4 pixels, 4×4=16 pixels, etc.) in the pixel array portion 11 is set as one block as on the motion detection mode. It should be noted that the number of pixels included in the one unit block on the feature detection mode is set to be smaller than the number of pixels included in the one unit block on the motion detection mode.

Then, on the feature detection mode, image information is acquired by reading electric-charge information for each block (binning technology). It should be noted that on the feature detection mode, image information may be acquired by reading electric-charge information of an arbitrary pixel of each block from each block (random sampling technology).

The resolution of the image information on the feature detection mode corresponds to, for example, video graphics array (VGA) (640×480 px), quarter VGA (QVGA) (320×240 px), quarter QVGA (QQVGA) (160×120 px), or the like.

On the imaging mode, for example, image information is acquired by reading electric-charge information for each pixel of the pixel array portion 11. The resolution of the image information on the imaging mode corresponds to, for example, full high definition (FHD) (1920×1080), high definition (HD) (1280×720), VGA (640×480), or the like.

The row scanning circuit 13 drives each pixel of the pixel array portion 11 and causes the pixel array portion 11 to acquire the analog-signal image information. A mode signal indicating which mode of the three modes the current mode is input into the row scanning circuit 13 from the mode control unit 16.

The row scanning circuit 13 controls the pixel array portion 11 on the motion detection mode to generate image information having the resolution for each block (i.e., low-resolution image information). Further, the row scanning circuit 13 controls the pixel array portion 11 to generate image information having the resolution (i.e., middle-resolution image information) for each block (smaller than the number of pixels included in one block on the motion detection mode). Further, on the imaging mode, the row scanning circuit 13 controls the pixel array portion 11 to generate image information having the resolution for each pixel (i.e., high-resolution image information).

The ADC 12 converts the analog-signal image information input from the pixel array portion 11 into digital-signal image information in synchronization with a clock signal. Then, the ADC 12 outputs the generated digital-signal image information to the switch 21.

Here, the ADC 12 A/D converts the low-resolution image information on the motion detection mode, and A/D converts the middle-resolution image information on the feature detection mode. Further, the ADC A/D converts the high-resolution image information on the imaging mode.

Therefore, as to the amount of data that needs to be A/D converted by the ADC 12, it is the smallest on the motion detection mode, the second smallest on the feature detection mode, and the largest on the imaging mode. Therefore, as to power consumption in the ADC 12, it is the smallest on the motion detection mode, the second smallest on the feature detection mode, and the largest on the imaging mode.

Therefore, the power consumption in the ADC 12 can be reduced as compared to the case where the pixel array portion 11 acquires constantly high-resolution image information and the ACD A/D converts the high-resolution image information.

The column scanning circuit 14 controls the ADC 12 to output the digital-signal image information to the switch 21.

The sensor control unit 15 comprehensively controls the respective parts of the image sensor 10, for example, on the basis of the program. It should be noted that specific processing of the sensor control unit 15 (in particular, the mode control unit 16, the motion detection unit 18, the feature detection unit 19) will be described later in detail with reference to FIG. 3.

The timing control unit 17 controls the operation timings of the row scanning circuit 13, the ADC 12, and the column scanning timing. A vertical synchronization signal having a predetermined frequency (e.g., 30 Hz, etc.) is input into the timing control unit 17.

The timing control unit 17 generates timing signals indicating the operation timings of the row scanning circuit 13, the ADC 12 and the column scanning circuit 14 in synchronization with the vertical synchronization signal and outputs the corresponding timing signals to the respective parts.

The switch 21 switches the output destination of the image information output from the ADC 12 on the basis of a mode signal input from the mode control unit 16.

On the motion detection mode, the switch 21 outputs the image information from the ADC 12 (low-resolution image information) to the motion detection unit 18. Further, on the feature detection mode, the switch 21 outputs the image information from the ADC 12 (middle-resolution image information) to the feature detection unit 19. Further, on the imaging mode, the switch 21 outputs the image information from the ADC 12 (high-resolution image information) to the image processing unit 20.

On the motion detection mode, the motion detection unit 18 determines whether the motion of the object to be imaged is detected on the basis of the low-resolution image information input from the ADC 12 via the switch 21, and outputs a determination result to the mode control unit 16.

The motion detection unit 18 includes a motion extraction unit 18a and a motion determination unit 18b. The motion extraction unit 18a extracts a motion of the object to be imaged on the basis of the low-resolution image information input from the ADC 12 via the switch 21, and outputs extracted motion information to the motion determination unit 18b. The motion determination unit 18b determines whether the motion is detected on the basis of the motion information, and outputs a determination result to the mode control unit 16.

On the feature detection mode, the feature detection unit 19 determines whether a specific feature is detected on the basis of the middle-resolution image information input from the ADC 12 via the switch 21, and outputs a determination result to the mode control unit 16.

The feature detection unit 19 includes a feature extraction unit 19a and a feature determination unit 19b. The feature extraction unit 19a extracts a feature of the object to be imaged on the basis of the middle-resolution image information input from the ADC 12 via the switch 21, and outputs the extracted feature information to the feature determination unit 19b. The feature determination unit 19b determines whether a specific feature is detected on the basis of the feature information, and outputs a determination result to the mode control unit 16.

On the imaging mode, the image processing unit 20 performs various types of image processing such as demosaicing processing, white balance processing, and filtering processing on the high-resolution image information input from the ADC 12 via the switch 21. Then, the image processing unit 20 outputs the high-resolution image information subjected to the image processing to the storage unit 2 and the display unit 3.

On the basis of the determination result input from the motion detection unit 18 and the determination result input from the feature detection unit 19, the mode control unit 16 controls the shift of the three modes, i.e., the motion detection mode, the feature detection mode, and the imaging mode. Further, when the mode is shifted, the mode control unit 16 outputs a mode signal indicating the mode after the shift (indicating the current mode) to the row scanning circuit 13 and the switch 21.

Figure 4:
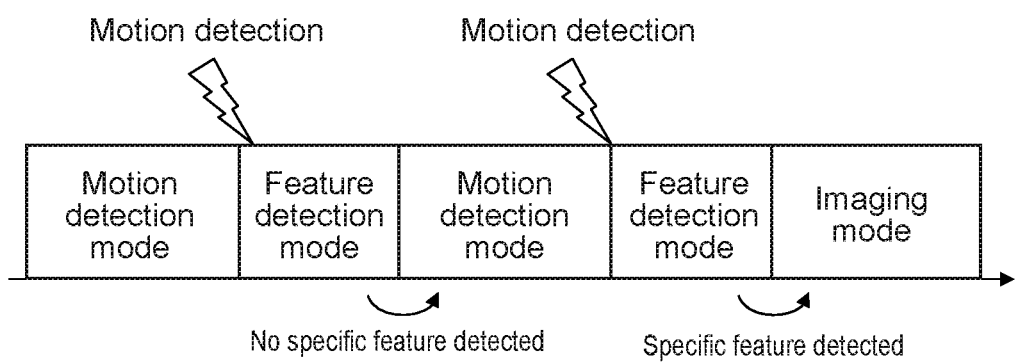
FIG. 4 A diagram showing a mode shift example.

Referring to FIG. 4 to be described later, typically, when the motion of the object to be imaged is detected on the motion detection mode, the mode control unit 16 shifts the mode from the motion detection mode to the feature detection mode. Further, when a specific feature (feature corresponding to an imaging target) is detected on the feature detection mode, the mode control unit 16 shifts the mode from the feature detection mode to the imaging mode. On the other hand, when a specific feature is not detected on the feature detection mode, the mode control unit 16 shifts the mode from the feature detection mode to the motion detection mode. Further, the mode control unit 16 shifts the mode from the imaging mode to the motion detection mode when a prescribed number of pieces of image information are acquired on the imaging mode.

Here, in the present embodiment, the image sensor 10 is held in the active state irrespective of the mode while the control unit 1, the storage unit 2, the display unit 3, the communication unit 5, and the like (hereinafter, the control unit 1 and the like) are held in the sleep state on some modes. That is, the control unit 1 and the like are held in the sleep state on the motion detection mode and the feature detection mode and are held in the active state only on the imaging mode. It should be noted that in a case where the user performs input via the operation unit 4, the control unit 1 and the like are exceptionally held in the active state irrespective of the mode.

When the mode is shifted from the feature detection mode to the imaging mode, the mode control unit 16 activates the control unit 1 and the like in the sleep state. Further, at this time, the mode control unit 16 also activates a reference-clock generation circuit (not shown) that supplies the control unit 1 and the like with a reference clock.

Further, when the mode is shifted from the imaging mode to the motion detection mode, the mode control unit 16 causes the control unit 1 and the like to enter the sleep state from the active state. Further, at this time, the mode control unit 16 also deactivates the reference-clock generation circuit (not shown) that supplies the control unit 1 and the like with a reference clock.

Since in the present embodiment, the control unit 1 and the like and the reference-clock generation circuit are activated only at necessary timings (imaging mode), power saving of the entire imaging apparatus 100 can be achieved.

<Operation Description>

Figure 3:
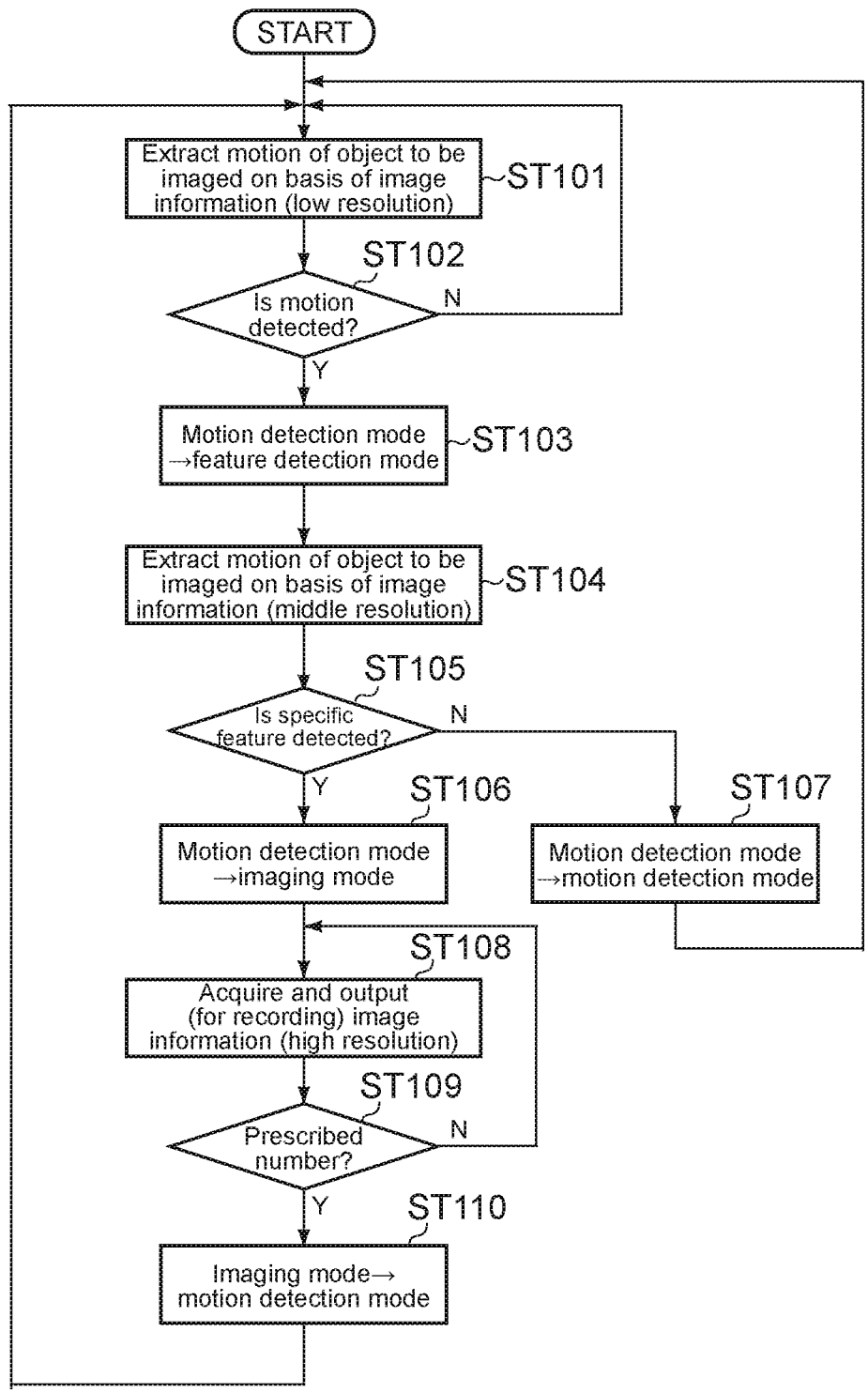
FIG. 3 A flowchart showing processing of a sensor control unit.

Next, processing of the sensor control unit 15 (in particular, the mode control unit 16, the motion detection unit 18, the feature detection unit 19) will be described. FIG. 3 is a flowchart showing the processing of the sensor control unit 15. FIG. 4 is a diagram showing a mode shift example.

In the description of FIG. 3, it is assumed that the current mode is initially set to be the motion detection mode. On the motion detection mode, the low-resolution image information is output from the pixel array portion 11, and this image information is A/D converted by the ADC 12 (the power consumption of the ADC is relatively low). Then, the low-resolution image information converted into the digital signal is input into the motion extraction unit 18a of the motion detection unit 18 via the switch 21.

When the low-resolution image information is input, the motion extraction unit 18a extracts a motion of the object to be imaged from this image information (Step 101). At this time, for example, the motion extraction unit 18a generates integrated information by adding up electric-charge information (luminance information) of the respective blocks included in the image information. Then, the motion extraction unit 18a extracts a difference between integrated information based on the current image information and integrated information based on the previous image information as motion information and outputs this motion information (difference) to the motion determination unit 18b.

When the motion information (difference) is input from the motion extraction unit 18a, the motion determination unit 18b of the motion detection unit 18 determines whether the motion of the object to be imaged is detected on the basis of this motion information (Step 102).

For example, the motion determination unit 18b compares the difference with a predetermined threshold, and determines that a motion of the object to be imaged is detected in a case where the difference is above the threshold (YES in Step 102). On the other hand, the motion determination unit 18b determines that a motion of the object to be imaged is not detected in a case where the difference is equal to or smaller than the threshold (NO in Step 102). Then, the motion determination unit 18b outputs a determination result as to whether the motion is detected to the mode control unit 16.

In a case where a motion of the object to be imaged is not detected (NO in Step 102), the mode is still the motion detection mode and the processing returns to Step 101. On the other hand, in a case where a motion of the object to be imaged is detected (YES in Step 102), the mode control unit 16 shifts the current mode from the motion detection mode to the feature detection mode (Step 103). At this time, the mode control unit 16 outputs a mode signal indicating that the current mode is the feature detection mode to the row scanning circuit 13 and the switch 21.

When the mode signal indicating the feature detection mode is input, the row scanning circuit 13 controls the pixel array portion 11 to cause the pixel array portion 11 to acquire middle-resolution image information. Further, when the mode signal indicating the feature detection mode is input, the switch 21 switches the output destination of the image information from the ADC 12 from the motion detection unit 18 (motion extraction unit 18a) to the feature detection unit 19 (feature extraction unit 19a).

Therefore, on the feature detection mode, the middle-resolution image information is output from the pixel array portion 11, and this image information is A/D converted by the ADC 12 (the power consumption of the ADC is relatively middle). Then, the middle-resolution image information converted into the digital signal is input into the feature extraction unit 19a of the feature detection unit 19 via the switch 21.

When the middle-resolution image information is input, the feature extraction unit 19a extracts, from this image information, feature information of the object to be imaged (information about a group of feature points, edge information, distance information, polarization information, spectrum information, etc.) and outputs this feature information to the feature determination unit 19b (Step 104).

It should be noted that the feature extraction unit 19a may extract the feature information from the entire image information or may extract the feature information from a specific portion of the image information. That is, on the feature detection mode, a point where the motion had been made has been determined in the motion detection, and therefore it is also possible to partially extract feature information from a portion corresponding to the point where this motion had been made. In this case, the power consumption in the image sensor 10 can be further reduced.

When the feature information is input from the feature extraction unit 19a, the feature determination unit 19b of the feature detection unit 19 determines whether a specific feature is detected on the basis of this feature information (Step 105).

In this case, for example, the feature determination unit 19b compares the extracted feature information with the cognitive model, and determines that a specific feature is detected in a case where the feature information matches the cognitive model (YES in Step 105). On the other hand, the feature determination unit 19b determines that a specific feature is not detected in a case where the feature information does not match the cognitive model (NO in Step 105). Then, the feature determination unit 19b outputs a determination result as to whether a specific feature is detected to the mode control unit 16.

The cognitive model is a model corresponding to an object to be imaged (e.g., a person, an animal, a car, etc.) assumed as the imaging target and stored in the feature determination unit 19b in advance.

Here, for example, in a case where a person is assumed as the imaging target, the feature determination unit 19b compares the extracted feature information with a cognitive model indicating the person's entire body, a cognitive model indicating the person's face and determines whether a specific feature is detected (human detection, facial detection).

Further, in a case where an animal such as a cat or dog is set as the imaging target, the feature determination unit 19b compares the extracted feature information with a cognitive model indicating the animal's entire body, a cognitive model indicating the animal's face and determines whether a specific feature is detected (animal detection, animal's face detection). Further, in a case where a car is assumed as the imaging target, the feature determination unit 19b compares the extracted feature information with a cognitive model indicating the entire car, a cognitive model indicating parts of the car and determines whether a specific feature is detected (car detection, portion detection).

It should be noted that in a case where a plurality of kinds of objects to be imaged is set as the imaging targets, the feature determination unit 19b compares the feature information with the corresponding cognitive models and determines whether a specific feature is detected. For example, in a case where a person and a car are set as the imaging targets, the feature determination unit 19b compares the extracted feature information with the cognitive model indicating the person's entire body, the cognitive model indicating the person's face, the cognitive model indicating the entire car, the cognitive model indicating the respective parts of the car and determines whether a specific feature is detected.

It should be noted that required imaging targets may be selectable among the plurality of kinds of imaging targets prepared in advance by the user via the operation unit 4. For example, it is assumed that respective kinds of imaging targets such as a person, an animal, and a car are prepared in advance, and the user has selected the person among them as a required imaging target. In this case, the feature determination unit 19b compares the feature information with the cognitive model indicating the person's entire body, the cognitive model indicating the person's face and determines whether a specific feature is detected.

On the feature detection mode, in a case where a specific feature is not detected (NO in Step 105), the mode control unit 16 shifts the current mode from the feature detection mode to the motion detection mode (Step 107).

On the left-hand side of FIG. 4, a state when a specific feature is detected on the feature detection mode and the mode is returned to the motion detection mode after the motion is detected on the motion detection mode and the mode is shifted to the feature detection mode is shown.

When shifting the mode from the feature detection mode to the motion detection mode, the mode control unit 16 outputs a mode signal indicating that the current mode is the motion detection mode to the row scanning circuit 13 and the switch 21.

When the mode signal indicating the motion detection mode is input, the row scanning circuit 13 controls the pixel array portion 11 to cause the pixel array portion 11 to acquire the low-resolution image information. Further, when the mode signal indicating the motion detection mode is input, the switch 21 switches the output destination of the image information from the ADC 12 from the feature detection unit 19 (feature extraction unit 19a) to the motion detection unit 18 (motion extraction unit 18a).

When the mode is shifted to the motion detection mode, the processing returns to Step 101.

On the feature detection mode, in a case where a specific feature is detected (YES in Step 105), the mode control unit 16 shifts the current mode from the feature detection mode to the imaging mode (Step 106).

On the right-hand side of FIG. 4, a state when a specific feature is detected on the feature detection mode and the mode is shifted to the imaging mode after the motion is detected on the motion detection mode and the mode is shifted to the feature detection mode is shown.

When shifting the mode to the imaging mode, the mode control unit 16 outputs a mode signal indicating that the current mode is the imaging mode to the row scanning circuit 13 and the switch 21. Further, at this time, the mode control unit 16 activates the control unit 1 and the like in the sleep state and also activates the reference-clock generation circuit that supplies the control unit 1 and the like with a reference clock.

When the mode signal indicating the imaging mode is input, the row scanning circuit 13 controls the pixel array portion 11 to cause the pixel array portion 11 to acquire the high-resolution image information. Further, when the mode signal indicating the imaging mode is input, the switch 21 switches the output destination of the image information from the ADC 12 from the feature detection unit 19 (feature extraction unit 19a) to the image processing unit 20.

Therefore, on the imaging mode, the high-resolution image information is output from the pixel array portion 11, and this image information is A/D converted by the ADC 12 (the power consumption of the ADC is relatively higher). Then, the high-resolution image information converted into the digital signal is input into the image processing unit 20 via the switch 21. The image processing unit 20 performs various types of image processing such as demosaicing processing on the high-resolution image information and outputs the high-resolution image information subjected to the image processing to the storage unit 2 and the display unit 3 (Step 108). With this, the high-resolution image information on the imaging mode is output from the image sensor 10, stored in the storage unit 2, and displayed on the display unit 3.

It should be noted that in the present embodiment, the low-resolution image information on the motion detection mode is used only for the motion detection and is not used for storage or for display. Similarly, the middle-resolution image information on the feature detection mode is used only for the feature detection and is not used for storage or for display. With this, it is possible to prevent the storage unit 2 from storing unnecessary information.

It should be noted that the low-resolution image information on the motion detection mode and the middle-resolution image information on the feature detection mode can also be used for storage or for display (in particular, as to the middle-resolution image information).

When the acquisition of the high-resolution image information is started on the imaging mode, the mode control unit 16 determines whether the number of pieces of image information acquired on the imaging mode reaches the prescribed number (Step 109). In a case where the number of pieces of image information acquired does not reach the prescribed number (NO in Step 109), the mode control unit 16 outputs the high-resolution image information from the image sensor 10 while maintaining the imaging mode as the mode (Step 108).

On the other hand, in a case where the number of pieces of image information acquired reaches the prescribed number (YES in Step 109), the mode control unit 16 shifts the current mode from the imaging mode to the motion detection mode (Step 110).

It should be noted that it is sufficient that the number of pieces of image information acquired on the imaging mode is set as appropriate, for example, 1, 2, 3, and so on. Further, the number of pieces of image information acquired on the imaging mode may be variable by the user in accordance with the user's input via the operation unit 4.

When shifting the mode to the motion detection mode, the mode control unit 16 outputs a mode signal indicating that the current mode is the motion detection mode to the row scanning circuit 13 and the switch 21. Further, at this time, the mode control unit 16 causes the control unit 1 and the like to enter the sleep state from the active state and also deactivates the reference-clock generation circuit that supplies the control unit 1 and the like with a reference clock.

When the mode signal indicating the motion detection mode is input, the row scanning circuit 13 controls the pixel array portion 11 to cause the pixel array portion 11 to acquire the low-resolution image information. Further, when the mode signal indicating the motion detection mode is input, the switch 21 switches the output destination of the image information from the ADC 12 from the image processing unit 20 to the motion detection unit 18 (motion extraction unit 18a).

When the mode is shifted to the motion detection mode, the processing returns to Step 101.

<Actions, Etc.>

Next, actions, etc. in the present embodiment will be described. First of all, in the present embodiment, a case where a motion of an animal that is not the imaging target is detected on the motion detection mode in the situation where the imaging target is a person will be assumed. In this case, due to the detection of the motion of the animal, the mode is shifted from the motion detection mode to the feature detection mode.

On the feature detection mode, feature information of the animal is extracted and the feature information of the animal is compared to the cognitive model of the person that is the imaging target. In this case, since the feature information does not match the cognitive model, the mode is returned to the motion detection mode from the feature detection mode (see the left-hand side of FIG. 4).

In contrast, a case where a motion of the person that is the imaging target is detected on the motion detection mode in a case where the imaging target is a person will be assumed. In this case, due to the detection of the motion of the person, the mode is shifted from the motion detection mode to the feature detection mode.

On the feature detection mode, feature information of the person is extracted and the feature information of the person is compared to the cognitive model of the person that is the imaging target. In this case, since the feature information matches the cognitive model, the mode is shifted from the feature detection mode to the imaging mode (see the right-hand side of FIG. 4). Then, after a prescribed number of pieces of high-resolution image information in which the person is shown are acquired on the imaging mode, the mode is returned to the motion detection mode from the imaging mode.

As described above, in the present embodiment, the mode is not shifted to the imaging mode when the object to be imaged the motion of which has been detected is not the imaging target in a case where a motion of the object to be imaged is detected on the motion detection mode. Then, in a case where a motion of the object to be imaged is detected on the motion detection mode, the mode is shifted to the imaging mode as long as the object to be imaged the motion of which has been detected is the imaging target.

Here, a case where the mode is two modes, i.e., the motion detection mode and the imaging mode will be assumed as a comparative example. In this case, in a case where erroneous detection (detection of a motion that is not the imaging target) occurs in the motion detection, shifting to the imaging mode is immediately performed, and therefore the number of shifts to the imaging mode unnecessarily increases, and there is a limitation on reduction of power consumption (in particular, the power consumption of the ADC).

In contrast, in the present embodiment, as described above, in a case where a motion of the object to be imaged is detected on the motion detection mode, the mode is shifted to the imaging mode as long as the object to be imaged the motion of which has been detected is the imaging target.

As described above, in the present embodiment, since the mode can be shifted to the imaging mode only as it is necessary, it is possible to prevent unnecessary shifting to the imaging mode due to erroneous detection.

Further, in the present embodiment, since the image information acquired on the feature detection mode has a resolution lower than that of the image information acquired on the imaging mode, the power consumption in the image sensor 10 (in particular, power consumption during A/D conversion by the ADC 12) can be reduced. Further, since the image information acquired on the feature detection mode has a resolution higher than that of the image information acquired on the motion detection mode, it is possible to suitably determine whether the object to be imaged the motion of which has been detected is the imaging target.

Further, in the present embodiment, the control unit 1 and the like are held in the sleep state on the motion detection mode and the feature detection mode and are held in the active state only on the imaging mode. Further, in the present embodiment, the reference-clock generation circuit that supplies the control unit 1 and the like with a reference clock is held in an inactive state on the motion detection mode and the feature detection mode and is held in the active state only on the imaging mode. With this, the power consumption of the entire imaging apparatus 100 can be further reduced.

Modified Example of First Embodiment

Here, in a case where the imaging target is an object that moves at high speed such as a car and the imaging target passes near the imaging apparatus 100, imaging on the imaging mode cannot be in time. In view of this, in a case where the imaging target is an object that moves at high speed such as a car (e.g., in a case where a car is selected by the user as the imaging target), the middle-resolution image information acquired on the feature detection mode may be stored in the storage unit 2.

That is, since the feature detection mode is a mode on which shifting is immediately performed once a motion of the object to be imaged is detected on the motion detection mode and the resolution of the image information acquired is not so high, time until the image information is acquired is also short. Further, on the feature detection mode, it is unnecessary to wait for activation of the control unit and the like unlike the imaging mode. Therefore, image information (resolution of which is not so high) of a high-speed moving object such as a car can be suitably saved by storing the image information used for the feature detection on the feature detection mode in the storage unit 2.

In the description of the first embodiment, the case where the resolution of the image information acquired by the pixel array portion 11 is different has been described as an example in a case where the resolution of the image information on each mode is different. On the other hand, on each mode, a bit resolution (ADC resolution) during the A/D conversion at the ADC 12 may be different. Alternatively, on each mode, the resolution of the image information acquired by the pixel array portion 11 and the bit resolution during the A/D conversion at the ADC 12 may be different. That is, the "resolution of the image information" means the resolution of the image information output from the pixel array portion 11 and/or the bit resolution (ADC resolution) of the image information output from the ADC 12.

In a case where the bit resolution is different, for example, image information having the same resolution (it may be different) is output from the pixel array portion 11 on each mode. In this case, on the motion detection mode, the ADC 12 A/D converts and outputs the image information at a bit resolution lower than that of the feature detection mode and the imaging mode. Further, on the feature detection mode, the ADC 12 A/D converts and outputs the image information at a bit resolution higher than that of the motion detection mode and lower than that of the imaging mode. Further, on the imaging mode, the ADC 12 A/D converts and outputs the image information at a bit resolution higher than that of the motion detection mode and the feature detection mode.

In this case, as to the power consumption in the ADC 12, it is the smallest on the motion detection mode, the second smallest on the feature detection mode, and the largest on the imaging mode. Therefore, in this case, the power consumption in the ADC 12 can be reduced as compared to a case of A/D converting the image information from the pixel array portion 11 constantly at a high bit resolution.

It should be noted that also in the respective embodiments to be described below, a case where the resolution of the image information acquired by the pixel array portion 11 is different will be described as an example in a case where the resolution of the image information on each mode is different. On the other hand, also in the respective embodiments to be described below, on each mode, the bit resolution during the A/D conversion at the ADC 12 (ADC resolution) may be different Second Embodiment Next, a second embodiment of the present technology will be described. It should be noted that the second embodiment in the description below, portions having functions and configurations identical to those of the first embodiment will be denoted by the same reference signs and the descriptions will be omitted or simplified.

In the second embodiment, the feature detection mode is divided into two modes, i.e., a first feature detection mode and a second feature detection mode. The second feature detection mode is a mode to more specifically perform feature detection than on the first feature detection mode.

The first feature detection mode is a mode on which image information having a resolution relatively higher than that of the image information that is used on the motion detection mode and having a resolution relatively lower than that of the image information that is used on the second feature detection mode and the imaging mode is acquired and is also a mode on which a feature of the object to be imaged is detected on the basis of the image information having this resolution. It should be noted that in the description below, the image information acquired on the first feature detection mode will be referred to as image information having a lower-middle resolution for the sake of convenience.

The second feature detection mode is a mode on which the image information having a resolution relatively higher than that of the image information that is used on the motion detection mode and the first feature detection mode and having a resolution relatively lower than that of the image information that is used on the imaging mode is acquired and is also a mode on which a feature of the object to be imaged is detected on the basis of the image information having this resolution. It should be noted that in the description below, the image information acquired on the second feature detection mode will be referred to as information having an upper-middle resolution for the sake of convenience image.

It should be noted that on the second feature detection mode, the feature detection is performed on the basis of the image information having the higher resolution than that of the image information that is used on the first feature detection mode, and therefore the accuracy of the feature detection is higher than on the first feature detection mode.

Figure 6:
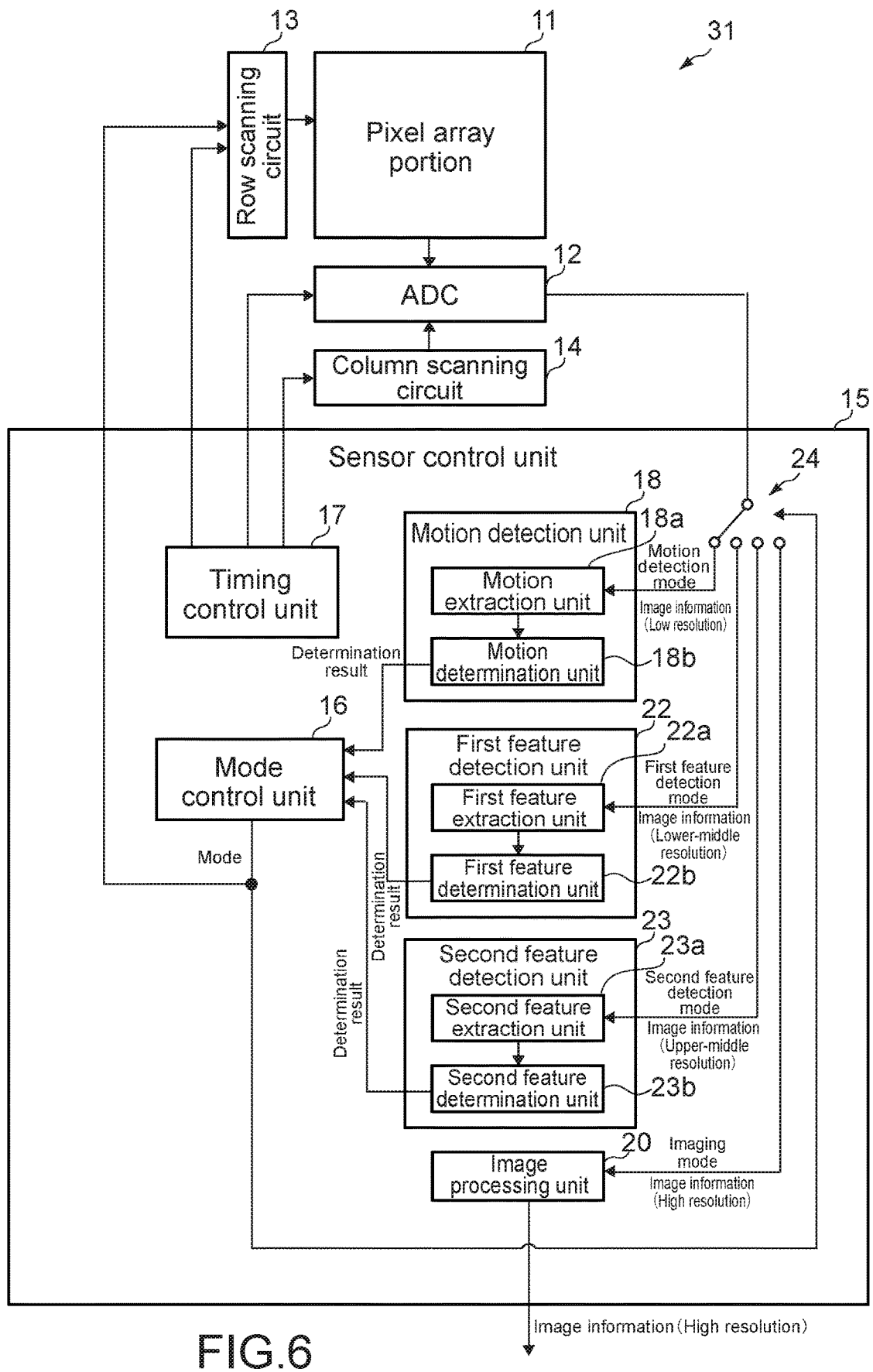
FIG. 6 A block diagram showing a configuration of an image sensor according to the second embodiment.

FIG. 6 is a block diagram showing a configuration of the image sensor 31 according to the second embodiment.

Although the image sensor 31 according to the second embodiment basically has configuration similar to that of the image sensor 10 according to the first embodiment, for the feature detection unit, two feature detection units, i.e., a first feature detection unit 22 and a second feature detection unit 23 are provided. Further, in the second embodiment, four output destinations of a switch 24 are set.

On the motion detection mode, the pixel array portion 11 outputs image information having the resolution such as 40×30 px, 32×20 px, and 16×5 px (low-resolution image information). Further, on the first feature detection mode, the pixel array portion 11 outputs image information having the resolution such as quarter VGA (QVGA) (320×240 px) and QQVGA (Quarter QVGA) (160×120 px) (image information having the lower-middle resolution).

Further, on the second feature detection mode, the pixel array portion 11 outputs image information having the resolution such as video graphics array (VGA) (640×480 px) and quarter VGA (QVGA) (320×240 px) (image information having the upper-middle resolution). Further, on the imaging mode, the pixel array portion 11 outputs image information having the resolution such as full high definition (FHD) (1920×1080), HD (high definition) (1280×720), and VGA (640×480) (high-resolution image information).

The ADC 12 A/D converts the low-resolution image information (low power consumption) on the motion detection mode, and A/D converts the image information having the lower-middle resolution (lower-middle power consumption) on the first feature detection mode. Further, the ACD A/D converts the image information having the upper-middle resolution (upper-middle power consumption) on the second feature detection mode, and A/D converts the high-resolution image information (high power consumption) on the imaging mode.

On the motion detection mode, the switch 24 outputs the image information from the ADC 12 (low-resolution image information) to the motion detection unit 18. Further, on the first feature detection mode, the switch 24 outputs the image information from the ADC 12 (image information having the lower-middle resolution) to the first feature detection unit 22.

Further, on the second feature detection mode, the switch 24 outputs the image information from the ADC 12 (image information having the upper-middle resolution) to the second feature detection unit 23. Further, on the imaging mode, the switch 24 outputs the image information from the ADC 12 (high-resolution image information) to the image processing unit 20.

On the first feature detection mode, the first feature detection unit 22 determines whether a specific feature is detected on the basis of the image information having the lower-middle resolution that is input from the ADC 12 via the switch 24, and outputs a determination result to the mode control unit 16.

The first feature detection unit 22 includes a first feature extraction unit 22a and a first feature determination unit 22b. The first feature extraction unit 22a extracts a feature of the object to be imaged on the basis of the image information having the lower-middle resolution that is input from the ADC 12 via the switch 24, and outputs the extracted feature information to the first feature determination unit 22b. The first feature determination unit 22b determines whether a specific feature is detected on the basis of the feature information, and outputs a determination result to the mode control unit 16.

On the second feature detection mode, the second feature detection unit 23 determines whether a specific feature is detected on the basis of the image information having the upper-middle resolution that is input from the ADC 12 via the switch 24, and outputs a determination result to the mode control unit 16.

The second feature detection unit 23 includes a second feature extraction unit 23a and a second feature determination unit 23b. The second feature extraction unit 23a extracts a feature of the object to be imaged on the basis of the image information having the upper-middle resolution that is input from the ADC 12 via the switch 24, and outputs the extracted feature information to the second feature determination unit 23b. The second feature determination unit 23b determines whether a specific feature is detected on the basis of the feature information, and outputs a determination result to the mode control unit 16.

<Operation Description>

Figure 7:
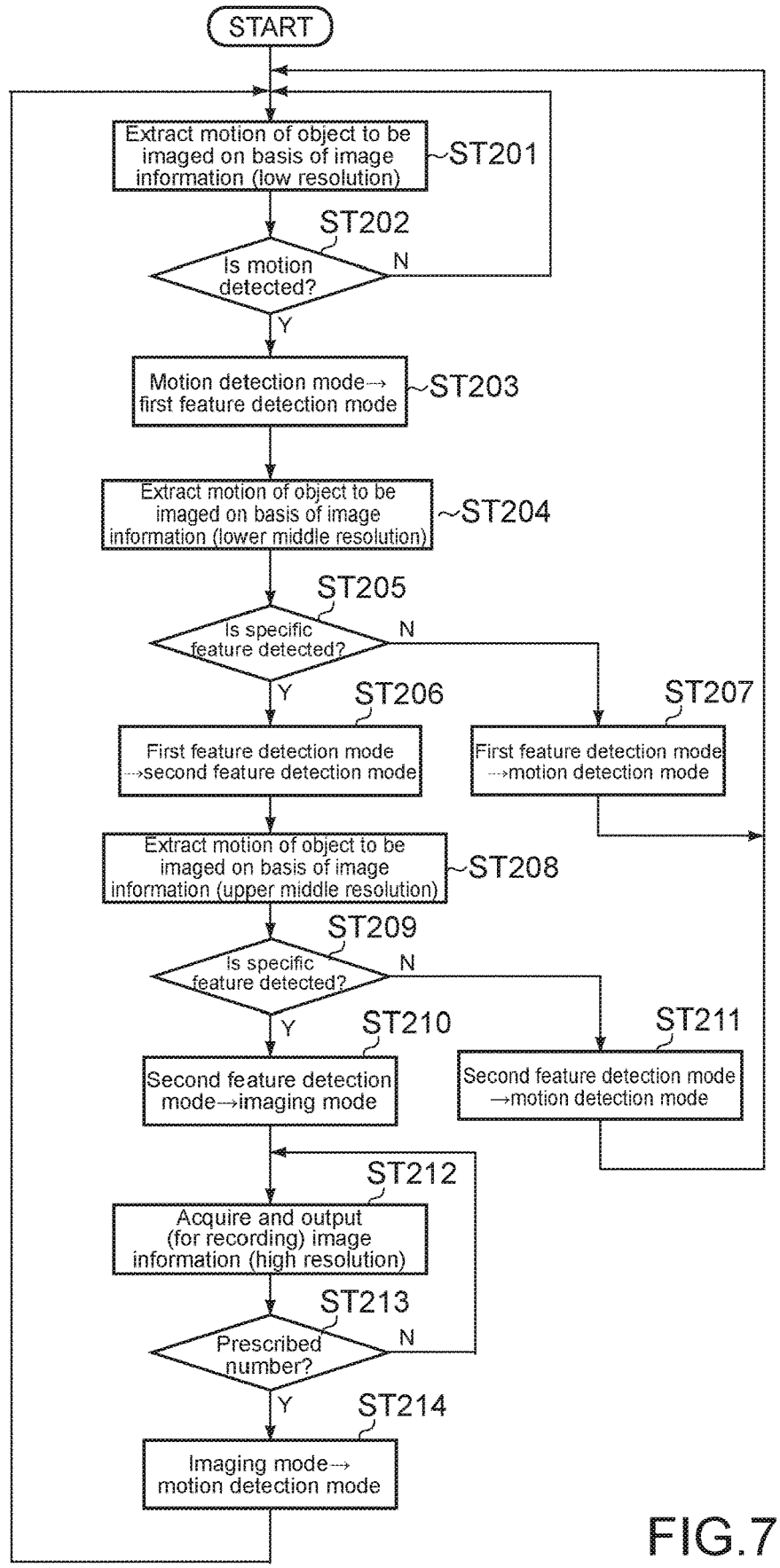
FIG. 7 A flowchart showing processing of a sensor control unit according to the second embodiment.
Figure 8:
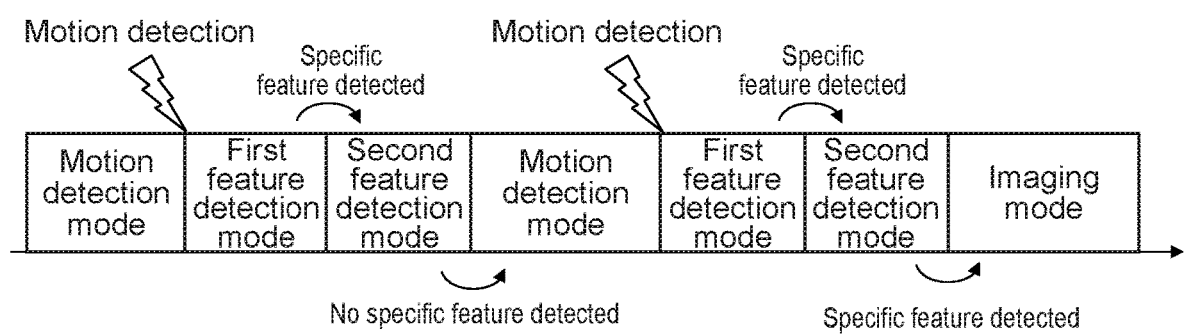
FIG. 8 A diagram showing a mode shift example.

Next, processing of the sensor control unit 15 (in particular, the mode control unit 16, the motion detection unit 18, the first feature detection unit 22, the second feature detection unit 23) will be described. FIG. 7 is a flowchart showing the processing of the sensor control unit 15 according to the second embodiment. FIG. 8 is a diagram showing a mode shift example.

On the motion detection mode, the motion extraction unit 18a extracts a motion of the object to be imaged from the low-resolution image information (Step 201). The motion determination unit 18b determines whether the motion of the object to be imaged is detected on the basis of the motion information from the motion extraction unit 18a (Step 202).

In a case where a motion of the object to be imaged is detected (YES in Step 202), the mode control unit 16 shifts the current mode from the motion detection mode to the first feature detection mode (Step 203).

On a first feature extraction mode, the first feature extraction unit 22a extracts feature information of the object to be imaged from the image information having the lower-middle resolution and outputs this feature information to the first feature determination unit 22b (Step 204).

On the basis of the feature information, the first feature determination unit 22b determines whether a specific feature is detected (Step 205).

In this case, for example, the first feature determination unit 22b compares the extracted feature information with the cognitive model (e.g., the cognitive model corresponding to the person), and determines that a specific feature is detected in a case where the feature information matches the cognitive model (YES in Step 205). On the other hand, the first feature determination unit 22b determines that a specific feature is not detected in a case where the feature information does not match the cognitive model (NO in Step 205).

On the first feature detection mode, in a case where a specific feature is not detected (NO in Step 205), the mode control unit 16 shifts the current mode from the first feature detection mode to the motion detection mode (Step 207).

On the other hand, in a case where a specific feature is detected on the first feature detection mode (YES in Step 205), the mode control unit 16 shifts the current mode from the first feature detection mode to the second feature detection mode (Step 206).

On the second feature detection mode, the second feature extraction unit 23a extracts feature information of the object to be imaged from the image information having the upper-middle resolution and outputs this feature information to the second feature determination unit 23b (Step 208).

On the basis of the feature information, the second feature determination unit 23b determines whether a specific feature is detected (Step 209).

In this case, for example, the second feature determination unit 23b compares the extracted feature information with the cognitive model (e.g., the cognitive model corresponding to the person), and determines that a specific feature is detected in a case where the feature information matches the cognitive model (YES in Step 209). On the other hand, the second feature determination unit 23b determines that a specific feature is not detected in a case where the feature information does not match the cognitive model (NO in Step 209).

Here, the cognitive model may be the same or different between the first feature detection mode and the second feature detection mode. In a case where the cognitive model is different between the two modes, for example, the cognitive model of the person's entire body may be used on the first feature detection mode (human detection) or the cognitive model of the person's face may be used on the second feature detection mode (facial detection).

On the second feature detection mode, in a case where a specific feature is not detected (NO in Step 209), the mode control unit 16 shifts the current mode from the second feature detection mode to the motion detection mode (Step 211).

On the left-hand side of FIG. 8, a state when a motion is detected on the motion detection mode, a specific feature is detected on the first feature detection mode, a specific feature is not detected on the second feature detection mode, and the mode is returned to the motion detection mode is shown.

On the other hand, on the second feature detection mode, in a case where a specific feature is detected (YES in Step 209), the mode control unit 16 shifts the current mode from the second feature detection mode to the imaging mode (Step 210).

On the right-hand side of FIG. 8, a state when a motion is detected on the motion detection mode, a specific feature is detected on the first feature detection mode, a specific feature is detected on the second feature detection mode, and the mode is shifted to the imaging mode is shown.

On the imaging mode, the image processing unit 20 performs various types of image processing such as demosaicing processing on the high-resolution image information input from the ADC 12 via the switch 24, and outputs the high-resolution image information subjected to the image processing to the storage unit 2 and the display unit 3 (Step 212).

When the acquisition of the high-resolution image information is started on the imaging mode, the mode control unit 16 determines whether the number of pieces of image information acquired on the imaging mode reaches the prescribed number (Step 213).

In a case where the number of pieces of image information acquired on the imaging mode reaches the prescribed number (YES in Step 213), the mode control unit 16 shifts the current mode from the imaging mode to the motion detection mode (Step 214).

In the second embodiment, since the feature detection mode has multiple stages, it is possible to more suitably prevent unnecessary shifting to the imaging mode due to erroneous detection.

Modified Example of Second Embodiment

In the description of the second embodiment, the case where the feature detection mode has two stages has been described. On the other hand, the feature detection mode may have three or more stages. In this case, the feature detection mode in the subsequent stage is configured to be capable of detecting a feature more specifically than the feature detection mode in the previous stage.

Here, any method can be used for the feature detection on these modes as long as the second feature detection mode (in the subsequent stage) is a mode to perform feature detection more specifically than the first feature detection mode (in the previous stage). For example, an example of a difference between the first feature detection mode and the second feature detection mode is as follows. It should be noted that the second embodiment corresponds to the following example 1.

1. The resolution of the image information (entire image) that is used for the feature detection on the second feature detection mode (in the subsequent stage) is higher than the resolution of the image information (entire image) that is used for the feature detection on the first feature detection mode (in the previous stage).

2. The image information that is used for the feature detection on the first feature detection mode (in the previous stage) is the entire image and the image information that is used for the feature detection on the second feature detection mode (in the subsequent stage) is a partial image (ROI: region of interest) corresponding to the portion subjected to the feature detection on the first feature detection mode (in the previous stage). In this case, the partial image on the second feature detection mode (in the subsequent stage) may be have a resolution higher than that of the corresponding point of the entire image on the first feature detection mode (in the previous stage).

3. The image information that is used for the feature detection on the first feature detection mode (in the previous stage) is a black and white image and the image information that is used for the feature detection on the second feature detection mode (in the subsequent stage) is a color image. It should be noted that this 3 can be combined with 1 and 2.

Third Embodiment

Next, a third embodiment of the present technology will be described.

Figure 9:
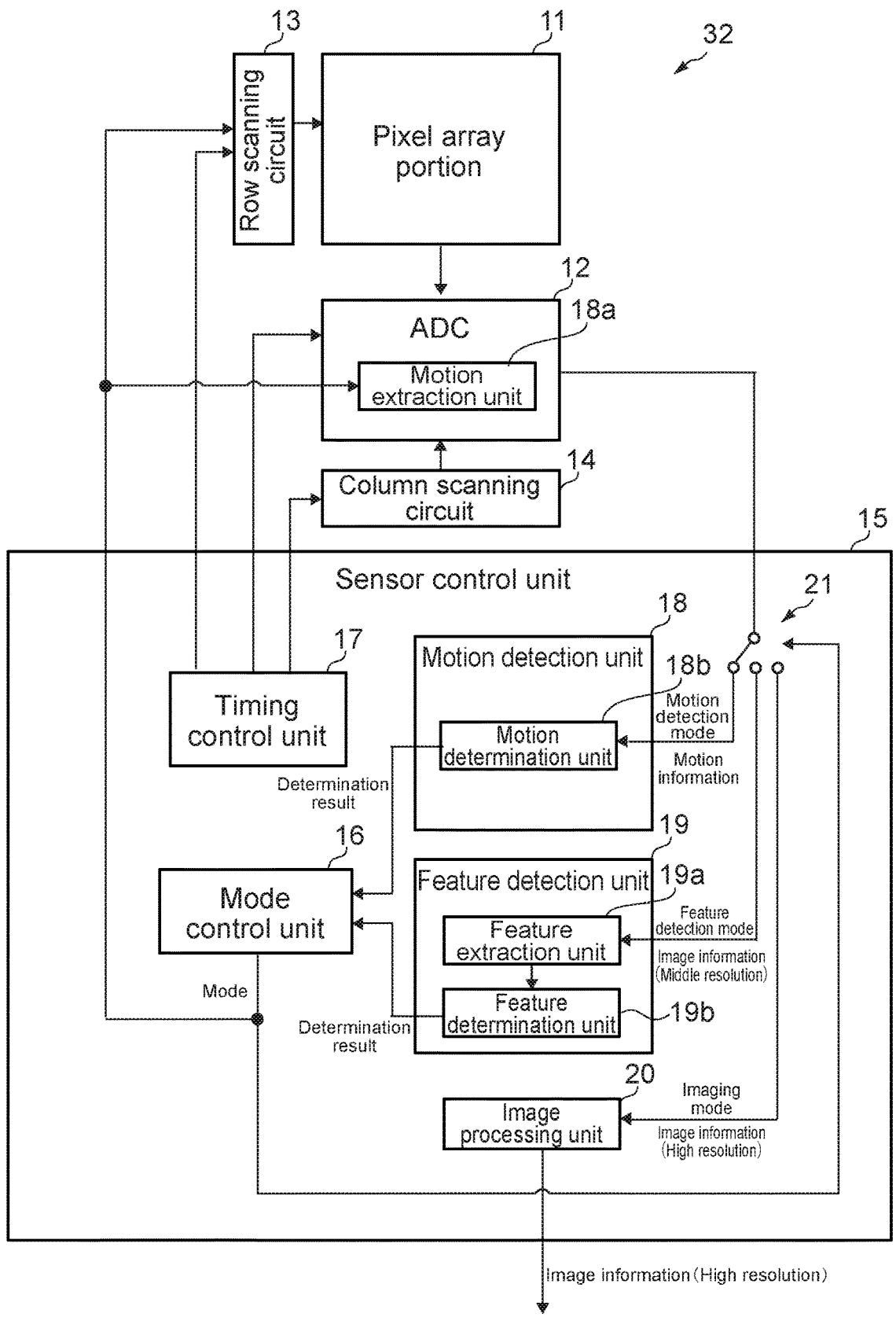
FIG. 9 A block diagram showing a configuration of an image sensor according to a third embodiment.

FIG. 9 is a block diagram showing a configuration of an image sensor 32 according to the third embodiment. In the third embodiment, although the feature detection unit 19 (feature detection mode) has a single stage as in the first embodiment, the feature detection unit 19 (feature detection mode) may have multiple stages as in the second embodiment. The same applies to a fourth embodiment, etc. to be described later.

In the first embodiment or the second embodiment, the motion extraction unit 18a of the motion detection unit 18 extracts a motion of the object to be imaged from the converted digital-signal image information. In contrast, in the third embodiment, the motion extraction unit 18a of the motion detection unit 18 is provided in the ADC 12, and the motion extraction unit 18a extracts a motion of the object to be imaged from analog-signal image information from the pixel array portion 11 on the motion detection mode.

A mode signal from the mode control unit 16 is input into the motion extraction unit 18a, and the motion extraction unit 18a operates only in a case where the current mode is the motion detection mode. On the motion detection mode, the motion extraction unit 18a extracts a motion from the low-resolution image information (analog signal) output from the pixel array portion 11 and outputs the motion information (analog signal) to the ADC 12.

On the motion detection mode, the ADC 12 converts the analog-signal motion information input from the motion extraction unit 18a into a digital signal and outputs the digital-signal motion information to the motion determination unit 18b via the switch 21. The motion determination unit 18b determines whether the motion is detected on the basis of the digital-signal motion information.

Other processing is basically similar to that of the first embodiment.

Here, in the first embodiment and the like, on the motion detection mode, the image information itself is A/D converted by the ADC 12. On the other hand, in the third embodiment, the motion information, not the image information itself, is A/D converted on the motion detection mode. For this reason, since the amount of data A/D converted by the ADC 12 is smaller as compared to the first embodiment and the like, the power consumption in the ADC 12 can be further reduced. Further, in a case of A/D converting the motion information, A/D conversion at a lower bit resolution is possible as compared to a case of A/D converting the entire image information, and the power consumption in the ADC 12 can be reduced also in this point.

It should be noted that in the first embodiment and the like, a motion of the object to be imaged is extracted on the basis of the digital-signal image information on the motion detection mode, and in this case, there is an advantage that the accuracy of motion extraction (motion detection) is higher as compared to the third embodiment where a motion of the object to be imaged is extracted on the basis of the analog-signal image information.

That is, in a case of performing motion extraction from the analog-signal image information as in the third embodiment, the accuracy of the motion extraction (motion detection) is lower while the power consumption in the ADC 12 can be reduced as compared to the first embodiment and the like. On the other hand, as in the first embodiment, in a case of performing motion extraction from the digital-signal image information, the power consumption in the ADC 12 is higher while the accuracy of the motion extraction (motion detection) can be improved as compared to the third embodiment.

Therefore, the power consumption and the accuracy of the motion extraction (motion detection) are trade-off and in a case where the power consumption reduction is prioritized, a configuration like the configuration described in the third embodiment is employed. On the other hand, in a case where the accuracy of the motion extraction (motion detection) is prioritized, a configuration like the configuration described in the first embodiment or the like is employed.

Fourth Embodiment

Figure 10:
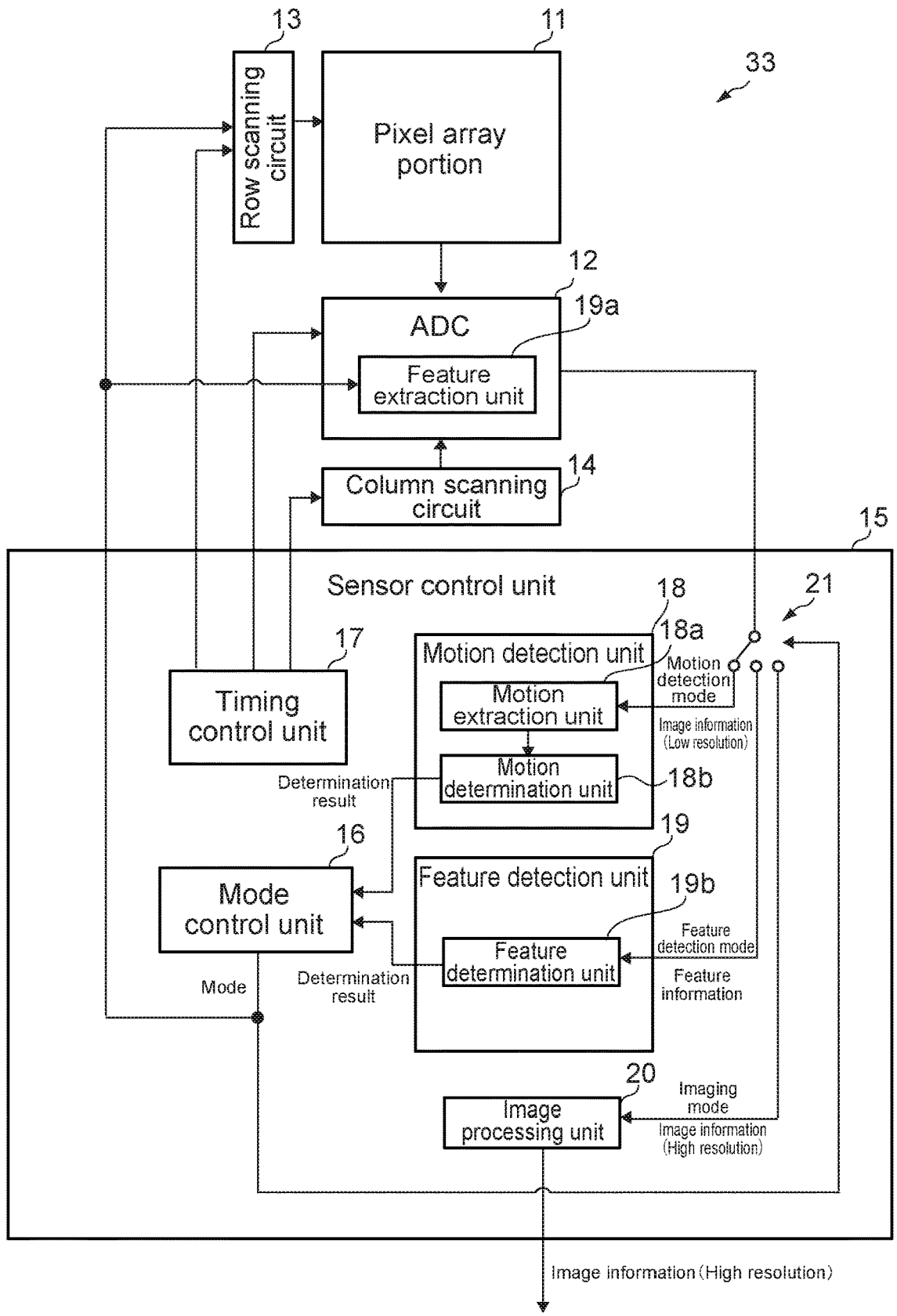
FIG. 10 A block diagram showing a configuration of an image sensor according to a fourth embodiment.

Next, a fourth embodiment of the present technology will be described. FIG. 10 is a block diagram showing a configuration of an image sensor 33 according to the fourth embodiment.

In the fourth embodiment, the feature extraction unit 19*a* of the feature detection unit 19 is provided in the ADC 12, and the feature extraction unit 19*a* extracts a feature of the object to be imaged from the analog-signal image information from the pixel array portion 11 on the feature detection mode.

A mode signal from the mode control unit 16 is input into the feature extraction unit 19*a*, and the feature extraction unit 19*a* operates only in a case where the current mode is the feature extraction mode. On the feature extraction mode, the feature extraction unit 19*a* extracts a feature of the object to be imaged from the middle-resolution image information (analog signal) output from the pixel array portion 11 and outputs the feature information (analog signal) to the ADC 12.

On the feature extraction mode, the ADC 12 converts the analog-signal feature information input from the feature extraction unit 19*a* into the digital signal and outputs this digital-signal feature information to the feature determination unit 19*b* via the switch 21. The feature determination unit 19*b* determines whether the motion is detected on the basis of the digital-signal feature information.

In the fourth embodiment, the feature information, not the image information itself, is A/D converted on the feature detection mode. For this reason, since the amount of data A/D converted by the ADC 12 is smaller as compared to the first embodiment and the like, the power consumption in the ADC 12 can be further reduced. Further, in a case of A/D converting the feature information, A/D conversion at a lower bit resolution is possible as compared to a case of A/D converting the entire image information, and the power consumption in the ADC 12 can be reduced also in this point.

In a case of performing feature extraction from the analog-signal image information as in the fourth embodiment, the accuracy of the feature extraction (feature detection) is lower while the power consumption in the ADC 12 can be reduced as compared to the first embodiment and the like. On the other hand, as in the first embodiment, in a case of performing feature extraction from the digital-signal image information, the power consumption in the ADC 12 is higher while the accuracy of the feature extraction (feature detection) can be improved as compared to the fourth embodiment.

Therefore, in a case where the power consumption reduction is prioritized, a configuration like the configuration described in the fourth embodiment is employed. On the other hand, in a case where the accuracy of the feature extraction (feature detection) is prioritized, a configuration like the configuration described in the first embodiment or the like is employed.

Fifth Embodiment

Figure 11:
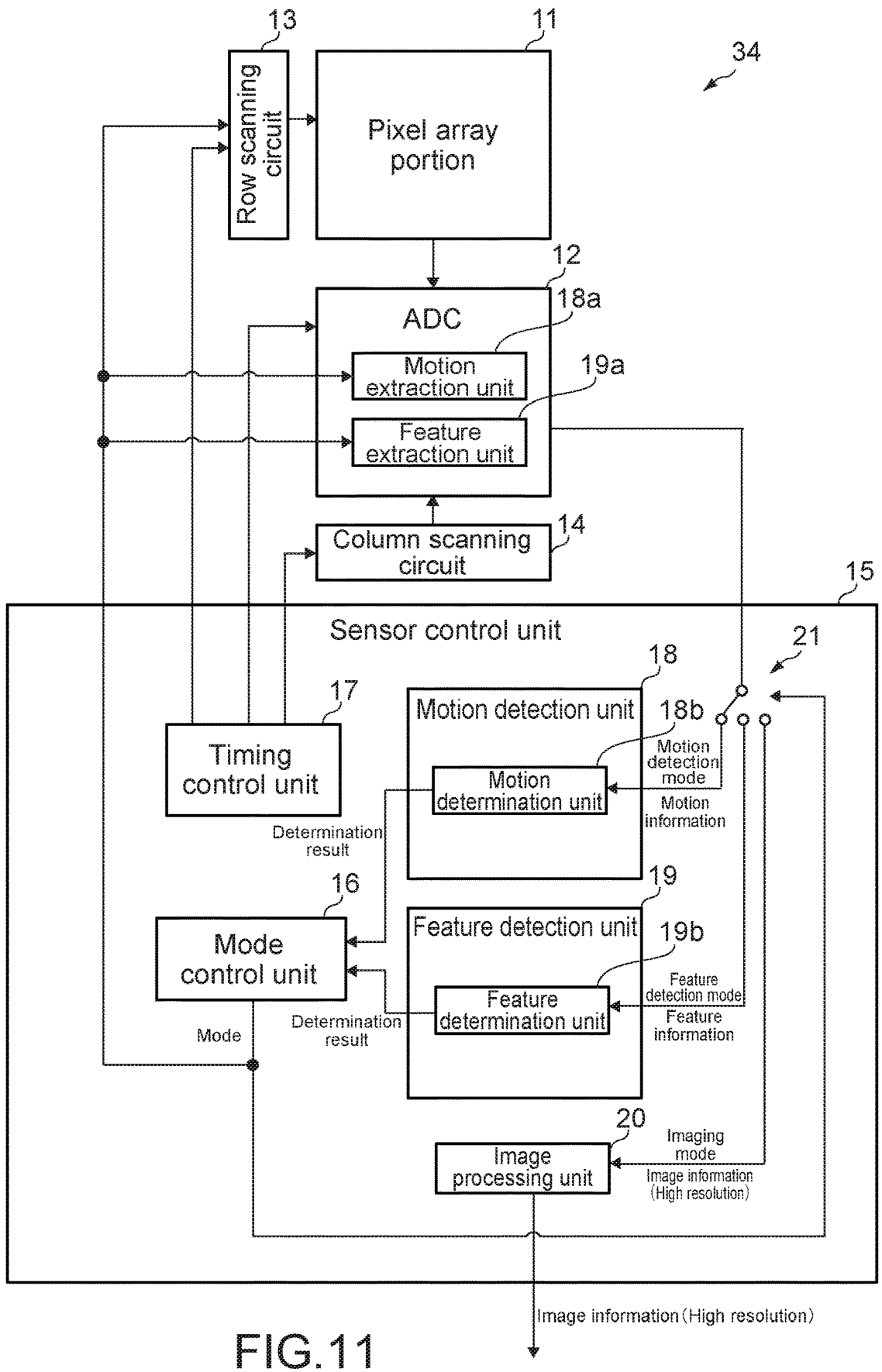
FIG. 11 A block diagram showing an image sensor according to a fifth embodiment.

Next, a fifth embodiment of the present technology will be described. FIG. 11 is a block diagram showing an image sensor 34 according to the fifth embodiment.

It can be said that the fifth embodiment is a combination of the third embodiment and the fourth embodiment. That is, in the fifth embodiment, the motion extraction unit 18*a* of the motion detection unit 18 and the feature extraction unit 19*a* of the feature detection unit 19 are both provided in the ADC 12.

In the fifth embodiment, since the motion information and the feature information, not the image information itself, are A/D converted by the ADC 12, the power consumption in the ADC can further reduced.

Sixth Embodiment

Figure 12:
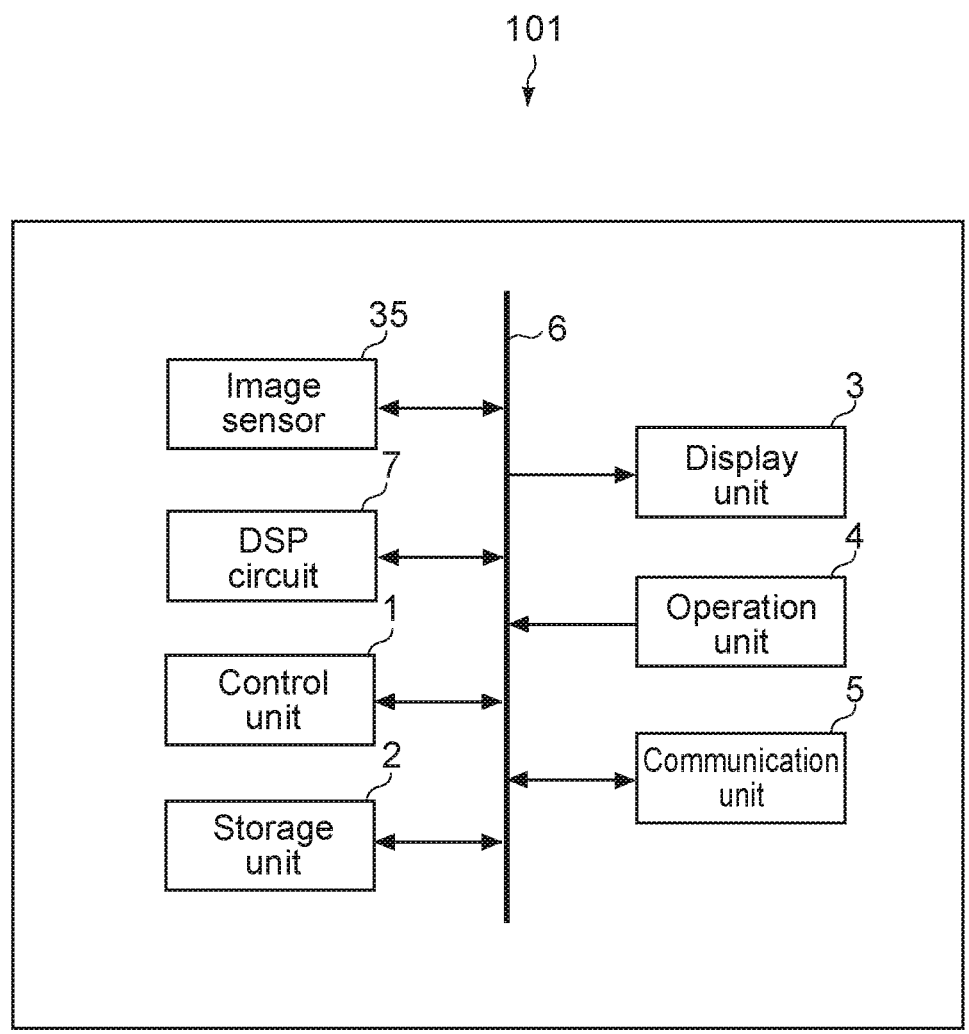
FIG. 12 A block diagram showing a configuration of an imaging apparatus according to a sixth embodiment.

Next, a sixth embodiment of the present technology will be described. FIG. 12 is a block diagram showing a configuration of an imaging apparatus 101 according to the sixth embodiment. As shown in FIG. 12, in the sixth embodiment, as compared to the imaging apparatus according to each of the above-mentioned embodiments, a digital signal processor (DSP) circuit 7 is added. It should be noted that image signal processor (ISP) circuit and the like may be used instead of the DSP circuit 7.

Figure 13:
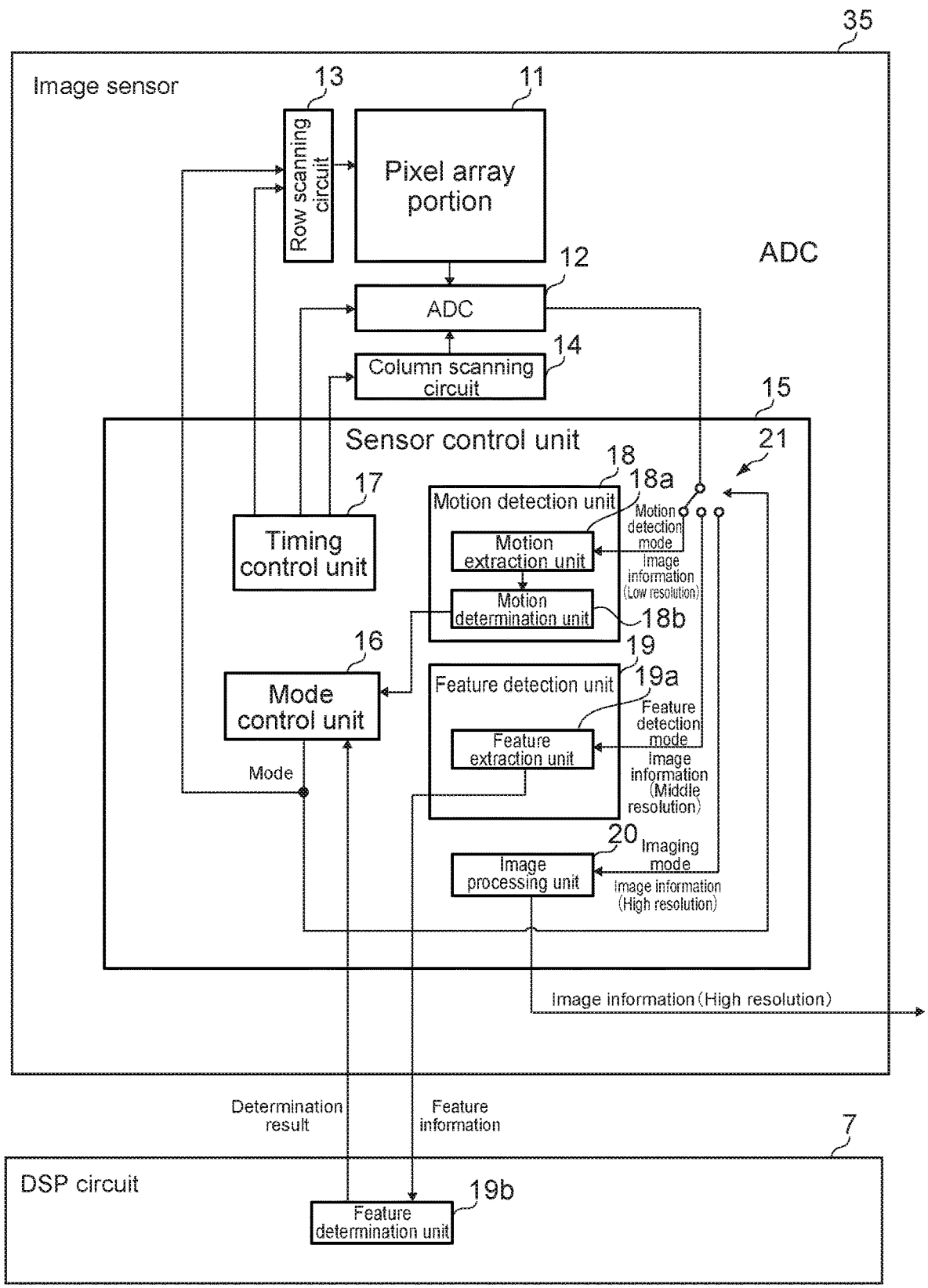
FIG. 13 A block diagram showing configurations of an image sensor and a DSP circuit.

FIG. 13 is a block diagram showing a configuration of an image sensor 35 and the DSP circuit 7. As shown in FIG. 13, in the sixth embodiment, the feature determination unit 19*b* of the feature detection unit 19 is provided inside the DSP circuit 7. That is, in the sixth embodiment, the feature determination unit 19*b* is provided outside the image sensor 35.

It should be noted that in the sixth embodiment, why the feature determination unit 19*b* is provided inside the DSP circuit 7 specially provided in the imaging apparatus 101 is that the processing of the feature determination is complicated than the other processing.

On the feature detection mode, the feature extraction unit 19*a* of the feature detection unit 19 extracts a feature of the object to be imaged from the middle-resolution image information input from the ADC 12. Then, the feature extraction unit 19*a* outputs the feature information to the feature determination unit 19*b* in the DSP circuit 7. It should be noted that the DSP circuit 7 is, for example, held in the active state only on the feature detection mode.

The feature determination unit 19*b* in the DSP circuit 7 determines whether a specific feature is detected on the basis of the feature information, and outputs a determination result to the mode control unit 16 in the image sensor 35.

The other processing is basically similar to that of the first embodiment.

In the sixth embodiment, since the feature determination unit 19*b* is provided inside the DSP circuit 7 specially provided outside the image sensor 35, the accuracy of the feature determination (feature detection) can be improved as compared to the first embodiment and the like. On the other hand, in a case where the feature determination unit 19*b* is provided inside the image sensor 10 as in the first embodiment and the like, there is an advantage that the time for the feature determination (feature detection) is shorter than in the sixth embodiment (e.g., because of unnecessity to activate the DPS circuit, no communication time between the DSP circuit 7 and the image sensor 35, and the like). Further, in a case where the feature determination unit 19*b* is provided inside the image sensor 10 as in the first embodiment and the like, there is an advantage that the power consumption is reduced (because it is unnecessary to supply the DSP circuit 7 with power) as compared to the sixth embodiment.

That is, in a case where the feature determination unit 19*b* is provided inside the DSP circuit 7 as in the sixth embodiment, the time for the feature determination (feature detection) is longer and the power consumption increases while the accuracy of the feature determination (feature detection) can be increased as compared to the first embodiment and the like. On the other hand, in a case where the feature determination unit 19*b* is provided inside the image sensor 10 as in the first embodiment and the like, the accuracy of the feature determination (feature detection) is lower while the time for the feature determination (feature detection) can be shortened and the power consumption can be reduced as compared to the sixth embodiment.

Therefore, a configuration like the configuration described in the sixth embodiment is employed in a case where the accuracy of the feature determination (feature detection) is prioritized, and a configuration like the configuration described in the first embodiment is employed in a case where the time reduction for the feature determination and the power consumption reduction are prioritized.

It should be noted that in a case where the DSP circuit 7 is added in the imaging apparatus 101 as in the sixth embodiment, the image processing unit 20 may be provided inside the DSP circuit 7.

In the sixth embodiment, the motion extraction unit 18a and the feature extraction unit 19a performs the motion extraction and the feature extraction from the digital-signal image information. However, as in the third embodiment to the fifth embodiment, at least one of the motion extraction unit 18a or the feature extraction unit 19a may perform the motion extraction and the feature extraction from the analog-signal image information.

Various Modified Examples

The present technology can also take the following configurations.

(1) An imaging apparatus, including
a mode control unit that
shifts, when a motion is detected on a motion detection mode to detect the motion on the basis of image information, the mode to a feature detection mode to detect features on the basis of image information having a higher resolution than a resolution of the image information that is used for the motion detection, and
shifts, when a specific feature is detected on the feature detection mode, the mode to an imaging mode to acquire image information having a higher resolution than the resolution of the image information that is used for the feature detection.

(2) The imaging apparatus according to (1), in which the mode control unit shifts the mode to the motion detection mode when the specific feature is not detected on the feature detection mode.

(3) The imaging apparatus according to (1) or (2), in which the mode control unit shifts the mode to the motion detection mode when a prescribed number of pieces of image information are acquired on the imaging mode.

(4) The imaging apparatus according to (1), in which the feature detection mode include a first feature detection mode and a second feature detection mode to more specifically perform feature detection than on the first feature detection mode.

(5) The imaging apparatus according to (4), in which the resolution of the image information that is used for the feature detection on the second feature detection mode is higher than the resolution of the image information that is used for the feature detection on the first feature detection mode.

(6) The imaging apparatus according to (4), in which the image information that is used for the feature detection on the first feature detection mode is an entire image and the image information that is used for the feature detection on the second feature detection mode is a partial image corresponding to a portion subjected to the features detection on the first feature detection mode.

(7) The imaging apparatus according to (6), in which the partial image has a resolution higher than a resolution of the entire image.

(8) The imaging apparatus according to any one of (4) to (7), in which
the mode control unit shifts the mode to the first feature detection mode when the motion is detected on the motion detection mode, shifts the mode to the second feature detection mode when a specific feature is detected on the first feature detection mode, and shifts the mode to the imaging mode when a specific feature is detected on the second feature detection mode.

(9) The imaging apparatus according to (8), in which
the mode control unit shifts the mode to when a specific feature is not detected on the first feature detection mode and shifts the mode to the motion detection mode when a specific feature is not detected on the second feature detection mode.

(10) The imaging apparatus according to any one of (1) to (9), further including
a motion extraction unit that extracts the motion from the image information on the motion detection mode.

(11) The imaging apparatus according to (10), in which the motion extraction unit extracts the motion from image information of an analog signal.

(12) The imaging apparatus according to (10), in which the motion extraction unit extracts the motion from image information of a digital signal.

(13) The imaging apparatus according to any one of (1) to (12), further including
a feature extraction unit that extracts the features from the image information on the feature detection mode.

(14) The imaging apparatus according to (13), in which the feature extraction unit extracts features from image information of an analog signal.

(15) The imaging apparatus according to (13), in which the feature extraction unit extracts features from image information of a digital signal.

(16) The imaging apparatus according to any one of (1) to (15), further including
an image sensor including a pixel array portion that obtains the image information, in which
inside the image sensor, provided are
the mode control unit,
a motion extraction unit that extracts the motion from the image information on the motion detection mode,
a motion determination unit that determines whether the motion is detected on the basis of the motion extracted by the motion extraction unit on the motion detection mode, and
a feature extraction unit that extracts features from the image information on the feature detection mode.

(17) The imaging apparatus according to (16), in which inside the image sensor, provided is a feature determination unit that determines whether the specific feature is detected on the basis of features extracted by the feature extraction unit on the feature detection mode.

(18) The imaging apparatus according to (16), in which outside the image sensor, provided is a feature determination unit that determines whether the specific feature is detected on the basis of features extracted by the feature extraction unit on the feature detection mode.

(19) An imaging control method, including:
  shifting, when the motion is detected on the motion detection mode to detect the motion on the basis of the image information, the mode to the feature detection mode to detect features on the basis of the image information having a higher resolution than a resolution of the image information that is used for the motion detection; and
  shifting, when a specific feature is detected on the feature detection mode, the mode to the imaging mode to acquire image information having a higher resolution than the resolution of the image information that is used for the feature detection.

(20) A program that causes a computer to execute processing, including:
  shifting, when a motion is detected on a motion detection mode to detect the motion on the basis of image information, the mode to a feature detection mode to detect features on the basis of image information having a higher resolution than a resolution of the image information that is used for the motion detection; and
  shifting, when a specific feature is detected on the feature detection mode, the mode to an imaging mode to acquire image information having a higher resolution than the resolution of the image information that is used for the feature detection.

REFERENCE SIGNS LIST 10, 31 to 35 image sensor
11 pixel array portion
12 ADC
13 row scanning circuit
14 column scanning circuit
15 sensor control unit
16 mode control unit
17 timing control unit
18 motion detection unit
19 feature detection unit
20 image processing unit
100, 101 imaging apparatus

The invention claimed is:

1. An imaging apparatus, comprising
at least one processor configured to:
  shift, in a case where a motion is detected on a motion detection mode based on first image information, from the motion detection mode to a feature detection mode, to detect features based on second image information,
    wherein a resolution of the second image information is higher than a resolution of the first image information;
  shift from the feature detection mode to the motion detection mode in a case where a specific feature on the feature detection mode is not detected;
  shift, in a case where the specific feature on the feature detection mode is detected, from the feature detection mode to an imaging mode to acquire third image information having a resolution higher than the resolution of the second image information;
  determine a number of pieces of the third image information acquired on the imaging mode reaches a prescribed number; and
  shift from the imaging mode to the motion detection mode based on the determination the number of pieces of the third image information reaches the prescribed number, wherein
    the specific feature corresponds to an imaging target of a plurality of imaging targets, and
    the imaging target is selectable, based on a user input, from the plurality of imaging targets.

2. The imaging apparatus according to claim 1, wherein the feature detection mode includes a first feature detection mode and a second feature detection mode, and
the second feature detection mode performs feature detection more specifically than on the first feature detection mode.

3. The imaging apparatus according to claim 2, wherein a resolution of fourth image information for the feature detection on the second feature detection mode is higher than a resolution of fifth image information for the feature detection on the first feature detection mode.

4. The imaging apparatus according to claim 2, wherein fourth image information for the feature detection on the first feature detection mode is an entire image, and
fifth image information for the feature detection on the second feature detection mode is a partial image corresponding to a portion subjected to the feature detection on the first feature detection mode.

5. The imaging apparatus according to claim 4, wherein the partial image has a resolution higher than a resolution of the entire image.

6. The imaging apparatus according to claim 2, wherein the at least one processor is further configured to:
  shift from the motion detection mode to the first feature detection mode based on the motion detected on the motion detection mode;
  shift from the first feature detection mode to the second feature detection mode based on the specific feature detected on the first feature detection mode; and
  shift from the second feature detection mode to the imaging mode based on the specific feature detected on the second feature detection mode.

7. The imaging apparatus according to claim 6, wherein the at least one processor is further configured to:
  shift from the first feature detection mode to the second feature detection mode in a case where the specific feature on the first feature detection mode is not detected; and
  shift from the second feature detection mode to the motion detection mode in a case where the specific feature on the second feature detection mode is not detected.

8. The imaging apparatus according to claim 1, wherein the at least one processor is further configured to extract the motion from the first image information on the motion detection mode.

9. The imaging apparatus according to claim 8, wherein the at least one processor is further configured to extract the motion from fourth image information of an analog signal.

10. The imaging apparatus according to claim 8, wherein the at least one processor is further configured to extract the motion from fourth image information of a digital signal.

11. The imaging apparatus according to claim 1, wherein the at least one processor is further configured to extract the features from the second image information on the feature detection mode.

12. The imaging apparatus according to claim 11, wherein the at least one processor is further configured to extract the features from fourth image information of an analog signal.

13. The imaging apparatus according to claim 11, wherein the at least one processor is further configured to extract the features from fourth image information of a digital signal.

14. The imaging apparatus according to claim 1, further comprising an image sensor including:
a pixel array portion configured to receive fourth image information; and
circuitry configured to:
extract the motion from the first image information on the motion detection mode;
determine whether the motion is detected based on the motion on the motion detection mode; and
extract the features from the second image information on the feature detection mode.

15. The imaging apparatus according to claim 14, wherein the image sensor is configured to determine whether the specific feature is detected based on the features extracted on the feature detection mode.

16. The imaging apparatus according to claim 14, wherein the circuitry is further configured to determine whether the specific feature is detected based on the features extracted on the feature detection mode.

17. An imaging control method, comprising:
shifting, by at least one processor, in a case where a motion is detected on a motion detection mode based on first image information, from the motion detection mode to a feature detection mode, to detect features based on second image information,
wherein a resolution of the second image information is higher than a resolution of the first image information;
shifting, by the at least one processor, from the feature detection mode to the motion detection mode in a case where a specific feature on the feature detection mode is not detected;
shifting, by the at least one processor, in a case where the specific feature on the feature detection mode is detected, from the feature detection mode to an imaging mode to acquire third image information having a resolution higher than the resolution of the second image information;
determining, by the at least one processor, a number of pieces of the third image information acquired on the imaging mode reaches a prescribed number; and
shifting, by the at least one processor, from the imaging mode to the motion detection mode based on the determination the number of pieces of the third image information reaches the prescribed number, wherein
the specific feature corresponds to an imaging target of a plurality of imaging targets, and
the imaging target is selectable, based on a user input, from the plurality of imaging targets.

18. A non-transitory computer-readable medium having stored thereon, computer-executable instructions that when executed by a computer in a system, causes the system to execute operations, the operations comprising:
shifting, in a case where a motion is detected on a motion detection mode based on first image information, from the motion detection mode to a feature detection mode, to detect features based on second image information, wherein a resolution of the second image information is higher than a resolution of the first image information;
shifting from the feature detection mode to the motion detection mode in a case where a specific feature on the feature detection mode is not detected;
shifting, in a case where the specific feature on the feature detection mode is detected, from the feature detection mode to an imaging mode to acquire third image information having a resolution higher than the resolution of the second image information;
determining a number of pieces of the third image information acquired on the imaging mode reaches a prescribed number; and
shifting from the imaging mode to the motion detection mode based on the determination the number of pieces of the third image information reaches the prescribed number the specific feature on the feature detection mode, wherein
the specific feature corresponds to an imaging target of a plurality of imaging targets, and
the imaging target is selectable, based on a user input, from the plurality of imaging targets.

* * * * *